(12) United States Patent
Choi et al.

(10) Patent No.: US 10,811,656 B2
(45) Date of Patent: *Oct. 20, 2020

(54) COMPOSITE MEMBRANE, PREPARATION METHOD THEREOF, AND LITHIUM-AIR BATTERY INCLUDING THE COMPOSITE MEMBRANE

(71) Applicant: Samsung Electronics Co., Ltd., Suwon-si, Gyeonggi-do (KR)

(72) Inventors: Won-sung Choi, Yongin-si (KR); Dong-min Im, Seoul (KR)

(73) Assignee: SAMSUNG ELECTRONICS CO; LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,451

(22) Filed: Jan. 22, 2018

(65) Prior Publication Data

US 2018/0145296 A1 May 24, 2018

Related U.S. Application Data

(63) Continuation of application No. 14/296,690, filed on Jun. 5, 2014, now Pat. No. 9,911,957.

(30) Foreign Application Priority Data

Sep. 13, 2013 (KR) ........................ 10-2013-0110622

(51) Int. Cl.
*H01M 2/16* (2006.01)
*H01M 2/14* (2006.01)
(Continued)

(52) U.S. Cl.
CPC ............... *H01M 2/166* (2013.01); *B32B 7/06* (2013.01); *B32B 7/12* (2013.01); *B32B 27/08* (2013.01);
(Continued)

(58) Field of Classification Search
CPC ....... C03C 1/006; C03B 19/06; G02F 1/1525; H01M 14/005; H01M 10/052; H01M 10/0525; B01D 71/40
(Continued)

(56) References Cited

U.S. PATENT DOCUMENTS 4,636,314 A * 1/1987 Beuhler ............... B01D 69/141
210/500.25
4,977,007 A * 12/1990 Kondo .................. G02F 1/1525
264/104
(Continued)

FOREIGN PATENT DOCUMENTS

EP 3041066 A1 * 7/2016
JP 2006059698 A 3/2006
(Continued)

OTHER PUBLICATIONS

Korean Office Action for Korean Patent Application No. 10-213-0110622 dated Feb. 14, 2020.

*Primary Examiner* — Khanh T Nguyen
(74) *Attorney, Agent, or Firm* — Cantor Colburn LLP

(57) ABSTRACT

A composite membrane including ion conductive inorganic particles; and a polymer layer, wherein the ion conductive inorganic particles penetrate the polymer layer. Also, a preparation method thereof, and a lithium-air battery including the composite membrane.

20 Claims, 12 Drawing Sheets

(51) Int. Cl.
*H01B 1/24* (2006.01)
*H01M 12/08* (2006.01)
*B32B 7/06* (2019.01)
*B32B 7/12* (2006.01)
*B32B 27/08* (2006.01)
*B32B 27/20* (2006.01)
*B32B 27/30* (2006.01)
*B32B 27/32* (2006.01)
*B32B 27/34* (2006.01)
*B32B 27/36* (2006.01)
*B32B 27/38* (2006.01)
*B32B 27/40* (2006.01)

(52) U.S. Cl.
CPC .............. *B32B 27/20* (2013.01); *B32B 27/30* (2013.01); *B32B 27/32* (2013.01); *B32B 27/34* (2013.01); *B32B 27/36* (2013.01); *B32B 27/38* (2013.01); *B32B 27/40* (2013.01); *H01B 1/24* (2013.01); *H01M 2/145* (2013.01); *H01M 2/1686* (2013.01); *H01M 12/08* (2013.01); *B32B 2264/10* (2013.01); *B32B 2307/202* (2013.01); *B32B 2307/7242* (2013.01); *B32B 2307/748* (2013.01); *B32B 2457/10* (2013.01); *H01M 2300/0094* (2013.01); *Y02E 60/10* (2013.01)

(58) Field of Classification Search
USPC .................. 204/252; 429/33, 320, 322, 144; 264/104
See application file for complete search history.

(56) References Cited

U.S. PATENT DOCUMENTS

| | | | |
|---|---|---|---|
| 7,071,121 B2 | 7/2006 | Punsalan et al. | |
| 7,282,295 B2 | 10/2007 | Visco et al. | |
| 7,691,536 B2 | 4/2010 | Johnson | |
| 7,767,345 B2 | 8/2010 | Imagawa et al. | |
| 7,972,743 B2 | 7/2011 | Umeda et al. | |
| 7,998,622 B2 | 8/2011 | Inda | |
| 8,148,436 B2 | 4/2012 | Capron et al. | |
| 9,178,254 B2 | 11/2015 | Lee et al. | |
| 9,520,627 B2 * | 12/2016 | Aetukuri | H01M 8/1048 |
| 9,911,957 B2 * | 3/2018 | Choi | H01M 2/166 |
| 2006/0008700 A1 * | 1/2006 | Yong | H01M 10/052 429/144 |
| 2006/0228608 A1 * | 10/2006 | Chung | H01B 1/122 429/483 |
| 2007/0117026 A1 * | 5/2007 | Kumar | C03C 1/006 429/320 |
| 2007/0119706 A1 * | 5/2007 | McNulty | H01M 14/005 204/252 |
| 2007/0231704 A1 * | 10/2007 | Inda | C03B 19/06 429/322 |
| 2008/0070087 A1 | 3/2008 | Johnson | |
| 2009/0155676 A1 | 6/2009 | Zhamu et al. | |
| 2010/0285388 A1 * | 11/2010 | Schank | H01M 4/8626 429/483 |
| 2011/0059355 A1 | 3/2011 | Zhang et al. | |
| 2011/0129739 A1 | 6/2011 | Nakanishi | |
| 2011/0223494 A1 | 9/2011 | Feaver et al. | |
| 2011/0281150 A1 * | 11/2011 | Yong | H01M 10/0525 429/144 |
| 2012/0024697 A1 * | 2/2012 | Antheunis | B01D 71/40 204/252 |
| 2012/0077084 A1 | 3/2012 | Christensen et al. | |
| 2012/0077095 A1 | 3/2012 | Roumi et al. | |
| 2013/0330639 A1 | 12/2013 | Lee et al. | |
| 2014/0234733 A1 | 8/2014 | Roev et al. | |
| 2015/0079485 A1 | 3/2015 | Choi et al. | |
| 2016/0181585 A1 * | 6/2016 | Choi | H01M 2/1686 429/403 |
| 2016/0336617 A1 * | 11/2016 | Yamazaki | H01M 10/0562 |

FOREIGN PATENT DOCUMENTS

| | | | |
|---|---|---|---|
| JP | 2013073721 A | * | 4/2013 |
| JP | 2013126649 A | | 6/2013 |
| KR | 1020070008027 A | | 1/2007 |
| KR | 1020120039447 A | | 4/2012 |

* cited by examiner

COMPOSITE MEMBRANE, PREPARATION METHOD THEREOF, AND LITHIUM-AIR BATTERY INCLUDING THE COMPOSITE MEMBRANE

RELATED APPLICATIONS

This application is a continuation application of application Ser. No. 14/296,690, filed Jun. 5, 2014, which claims priority to and the benefit of Korean Patent Application No. 10-2013-0110622, filed on Sep. 13, 2013, in the Korean Intellectual Property Office, and all the benefits accruing therefrom under 35 U.S.C. § 119, the content of which is incorporated herein in its entirety by reference.

BACKGROUND

1. Field

The present disclosure relates to a composite membrane, a preparation method thereof, and a lithium-air battery including the composite membrane.

2. Description of the Related Art

Lithium-air batteries include an anode able to intercalate/deintercalate lithium ions, a cathode including oxygen as a cathode active material and a redox catalyst for oxygen, and a lithium-ion conductive medium between the cathode and the anode.

Lithium-air batteries have a theoretical energy density of about 3,000 Watt-hours per kilogram (Wh/kg) or more, which is greater than that of lithium-ion batteries. In addition, lithium-air batteries are environmentally friendly and are safer than lithium-ion batteries. To improve the cell performance of lithium-air batteries, there remains a need for a separator having improved moisture and gas blocking properties, and improved lithium ion transport properties.

SUMMARY

Provided are novel composite membranes and preparation methods thereof.

Provided are lithium-air batteries having improved cell performance using the composite membranes.

Additional aspects will be set forth in part in the description which follows and, in part, will be apparent from the description, or may be learned by practice of the presented embodiments.

According to an aspect, a composite membrane includes: ion conductive inorganic particles; and a polymer layer, wherein the ion conductive inorganic particles penetrate the polymer layer.

According to another aspect, a method of preparing the composite membrane includes: disposing ion conductive inorganic particles on a release film; forming a polymer layer on the release film having the ion conductive inorganic particles disposed thereon; and removing the release film to prepare the composite membrane.

The method may further include polishing the resulting product in which the release film is removed.

The forming of the polymer layer may include disposing a polymer composition on the release film to form the polymer layer.

The polymer composition may include a solvent and one or more selected from a polymer and a monomer for forming a polymer.

The disposing of the ion conductive inorganic particles on the release film may include adhering the ion conductive inorganic particles to the release film and applying pressure to the ion conductive inorganic particles on the release film.

According to another aspect, a lithium-air battery includes the composite membrane.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
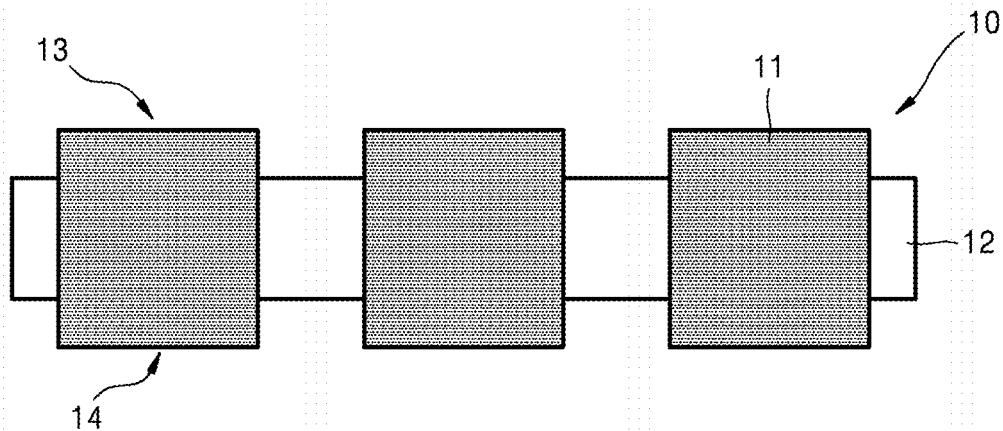
FIGS. 1 through 4 are schematic views each illustrating a structure of an embodiment of a composite membrane.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkyl" as used herein means a C1 to C24 straight or branched chain, saturated, monovalent hydrocarbon group (e.g., methyl or hexyl).

"Group" means a group of the Periodic Table of the Elements according to the International Union of Pure and Applied Chemistry ("IUPAC") Group 1-18 group classification system.

"Rare earth" means the fifteen lanthanide elements, i.e., atomic numbers 57 to 71, plus scandium and yttrium.

The "lanthanide elements" means the chemical elements with atomic numbers 57 to 71.

"Transition metal" as defined herein refers to an element of Groups 3 to 12 of the Periodic Table of the Elements.

Hereinafter, a composite membrane, a preparation method thereof, and a lithium-air battery and a lithium secondary battery each comprising the composite membrane will be disclosed in more detail.

A composite membrane including ion conductive inorganic particles and a polymer layer, and having a structure in which the ion conductive inorganic particles penetrate the polymer layer, is provided.

The ion conductive inorganic particles may comprise a single-body particle without boundaries therein. Thus an ion conductive inorganic particle of the ion conductive inorganic particles may consist of a single particle not having grain boundaries therein. Thus, grain boundaries are not observed in the ion conductive inorganic particles. In an embodiment the ion conductive inorganic particles may comprise particles which are single-crystalline. In another embodiment, ion conductive inorganic particles may comprise particles which comprise a glass without grain boundaries therein. In an embodiment, the ion conductive inorganic particles consist of single-body particles, each without boundaries therein.

FIGS. 1 through 4 each schematically illustrate a structure of an embodiment of a composite membrane.

Referring to FIGS. 1 to 4, composite membranes 10, 20, 30, and 40 have structures in which ion conductive inorganic particles 11, 21, 31, and 41, respectively, penetrate polymer layers 12, 22, 32, and 42, respectively. "Penetrate" as used herein means that at least some portion of the particle is exposed on a surface of the composite membrane.

Figure 2:
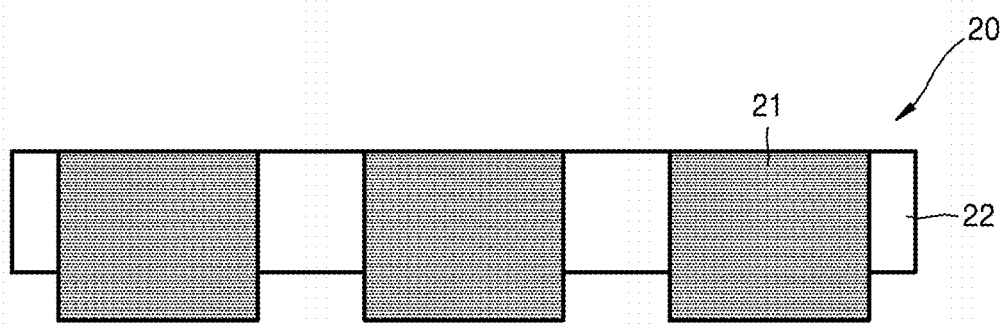
Figure 3:
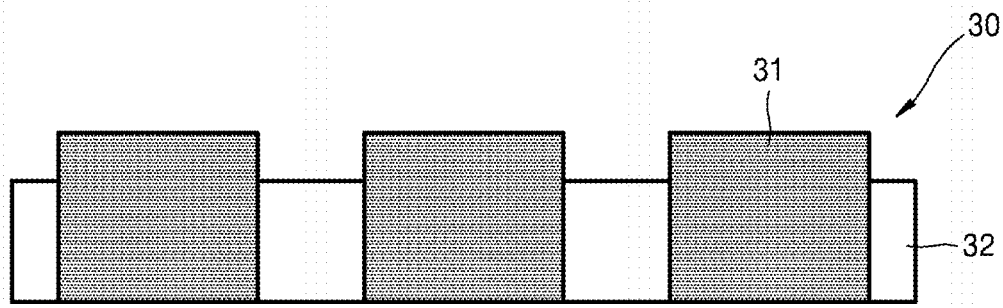

As illustrated in FIGS. 1 to 3, thicknesses of the ion conductive inorganic particles 11, 21, and 31 are greater than thicknesses of the polymer layers 12, 22, and 32 in the composite membranes 10, 20, and 30. Herein, the expression "thickness of an ion conductive inorganic particle" denotes a dimension between a top surface and a bottom surface of the ion conductive inorganic particle, regardless of the shape of the ion conductive inorganic particle.

As described above, when the thicknesses of the ion conductive inorganic particles 11, 21, and 31 are greater than those of the polymer layers 12, 22, and 32, ionic conductivities of the composite membranes 10, 20, and 30 may be improved because surface areas of the ion conductive inorganic particles 11, 21, and 31 are relatively greater than those of the polymer layers 12, 22, and 32.

The ion conductive inorganic particles 11, 21, 31, and 41 may form an ion-conductive region, and the polymer layers 12, 22, 32, and 42 may form a non-ion conductive region. The ion-conductive region and the non-ion conductive region are disposed to be in contact with each other in a width direction (e.g., an X-axis direction) of the composite membrane, and thus, a bicontinuous structure is obtained.

The expression "bicontinuous structure" denotes a structure in which the ion conductive inorganic particles, which, while not wanting to be bound by theory, are understood to provide the ion-conductive regions, and the polymer layer, which is understood to provide the non-ion conductive regions, are connected to one another through contact.

Figure 4:
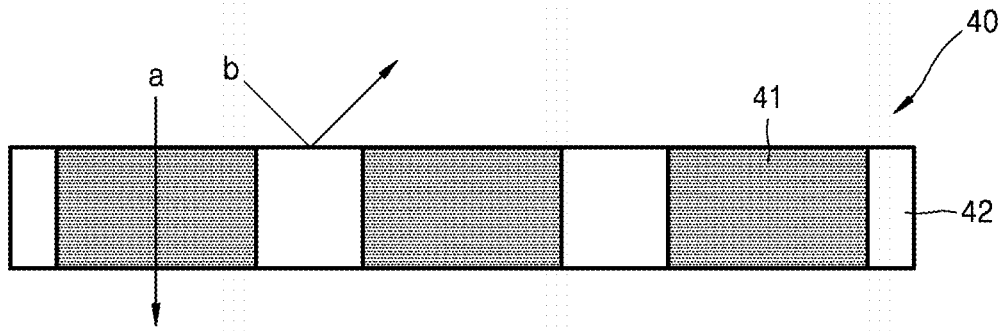

In the composite membrane 40 of FIG. 4, the ion conductive inorganic particles 41 and the polymer layer 42 have the same thickness. When the ion conductive inorganic particles 41 and the polymer layer 42 have the same thickness, binding of the composite membrane 40 to other components may be facilitated, and thus, a binding force may be improved.

The ion conductive inorganic particles 11, 21, 31, and 41 may have the shape of a single-body particle without boundaries, e.g., grain boundaries, in the particles.

The composite membranes 10, 20, 30, and 40 of FIGS. 1 to 4 may be used as a gas permeation barrier layer of a lithium-air battery, and may also be used as an anode protective layer of a lithium secondary battery.

When the composite membrane 40 of FIG. 4 is used as an oxygen permeation barrier layer of a lithium-air battery, ions (e.g., lithium ions) may pass through the ion-conductive region comprising the ion conductive inorganic particles 41, e.g., in the direction illustrated by "a" of FIG. 4, and a gas, such as oxygen, or moisture may be substantially or effectively blocked by the polymer layer 42, as illustrated by "b" of FIG. 4. Herein, the polymer layer 42 may include a polymer having properties effective to suitably block moisture and the gas, which may be oxygen, carbon dioxide, or a combination thereof.

The ion conductive inorganic particles 11, 21, 31, and 41 are not limited to shapes illustrated in FIGS. 1 to 4 and may have any suitable shape. For example, the ion conductive inorganic particles 11, 21, 31, and 41 may have various shapes, such as one or more selected from a cube, spherical, circular, elliptical, rod, square, and a bar shape.

Since the composite membranes 10, 20, 30, and 40 have structures in which the ion conductive inorganic particles 11, 21, 31, and 41, respectively, penetrate the polymer layers 12, 22, 32, and 42, respectively, from front surfaces thereof to back surfaces thereof, the ion conductive inorganic particles 11, 21, 31, and 41 are respectively exposed from both surfaces of the composite membranes 10, 20, 30, and 40. Thus, when a composite membrane has a structure in which ion conductive inorganic particles are exposed from both surfaces of the composite membrane, a movement path of lithium ions may be maintained, and thus, the conductivity of the composite membrane may be improved.

In a lithium-air battery, an ion conductive function and an oxygen barrier function may be simultaneously performed using a ceramic membrane. However, it may be difficult to prepare a large-sized ceramic membrane. Also, a shape of the ceramic membrane may be limited. Further, the mechanical strength of the ceramic membrane may be insufficient, and thus, for example, the composite membrane comprising the ceramic membrane may be easily broken by external impact. Also, there may be a limitation to reducing the weight or thickness of the ceramic membrane. Thus, it may be difficult to commercialize a lithium-air battery with the ceramic membrane.

However, in the composite membrane, since the ion conductive inorganic particles are exposed from both front and rear surfaces of the composite membrane, a path through which ions more readily move may be prepared. Thus, the ionic conductivity of the composite membrane may be improved. Also, when compared with a ceramic membrane, since the composite membrane may be formed as a thin film, the resistance thereof may be decreased, and a lightweight and large-sized composite membrane may be readily prepared. In addition, since the composite membrane includes a polymer, the flexibility thereof may be improved. Thus a cell design may be flexible, the composite membrane may be processed as desired, and the mechanical strength thereof may also be improved.

In an embodiment where the composite membrane includes a polymer that has properties of blocking moisture and a gas, such as oxygen and carbon dioxide, the composite membrane may have an improved ability to block moisture or the gas. Therefore, the composite membrane may be prepared at a lower cost than the ceramic membrane, and when the composite membrane is used, a large-sized, thin, and lightweight battery may be prepared, and a preparation process may be simplified. Also, a battery having improved lifetime may be prepared by using the composite membrane.

According to another aspect, provided is a composite membrane including an ion-conductive region and a non-ion conductive region and having a bicontinuous structure, in which the ion-conductive region and the non-ion conductive region are disposed to be in contact with each other in a width direction (e.g., an X-axis direction) of the composite membrane, wherein the ion-conductive region comprises the ion conductive inorganic particles and the non-ion conductive region comprises a polymer.

The ion conductive inorganic particles may form the ion-conductive region, and the polymer layer may form the non-ion conductive region. The ion conductive inorganic particles may have the shape of a single-body particle and may be without grain boundaries therein.

Since the ion conductive inorganic particles are exposed from the surfaces of the composite membrane, the flexibility of the composite membrane may be improved while retaining ionic conductivity. Thus, the composite membrane may be processed as desired and the mechanical strength thereof may be improved.

According to an embodiment, a first surface of the ion-conductive region is bonded to a second surface of the non-ion conductive region, and an area of the first surface is greater than that of the second surface. When the area of the first surface of the ion-conductive region is greater than that of the second surface of the non-ion conductive region, ionic conductivity characteristics of the composite membrane may be improved.

According to an embodiment, the thickness of the ion conductive inorganic particle of the ionic-conductive region is greater than that of the polymer layer of the non-ionic conductive region.

The ion conductive inorganic particles may comprise lithium-ion conductive inorganic particles.

Examples of the ion conductive inorganic particles may be one or more selected from the group consisting of $BaTiO_3$, $Pb(Zr_xTi_{1-x})O_3$ wherein $0 \leq x \leq 1$ (PZT), $Pb_{1-x}La_xZr_{1-y}Ti_yO_3$(PLZT) wherein $0 \leq x < 1$ and $0 \leq y < 1$, $Pb(Mg_3Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate (e.g., $Li_3PO_4$), lithium titanium phosphate (e.g., $Li_xTi_y(PO_4)_3$ wherein $0<x<2$ and $0<y<3$), lithium aluminum titanium phosphate (e.g., $Li_xAl_yTi_z(PO_4)_3$, wherein $0<x<2$, $0<y<1$, $0<z<3$), $Li_{1+x+y}(Al_aGa_{1-a})_x(Ti_bGe_{1-b})_{2-x}Si_yP_{3-y}O_{12}$ (wherein $0 \leq x \leq 1$, $0 \leq y \leq 1$, $0 \leq a \leq 1$ and $0 \leq b \leq 1$), lithium lanthanum titanate (e.g., $Li_xLa_yTiO_3$, wherein $0<x<2$, $0<y<3$), lithium germanium thiophosphate ($Li_xGe_yP_zS_w$, wherein $0<x<4$, $0<y<1$, $0<z<1$, $0<w<5$), lithium nitride (e.g., $Li_xN_y$, wherein $0<x<4$, $0<y<2$), $SiS_2$, a $Li_xSi_yS_z$-based glass wherein $0<x<3$, $0<y<2$, and $0<z<4$, $P_2S_5$ (e.g., $Li_xP_yS_z$, wherein $0<x<3$, $0<y<3$, $0<z<7$-based glass, $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, garnet-based ceramics, and $Li_{3+x}La_3M_2O_{12}$ (wherein M is one or more selected from tellurium (Te), niobium (Nb), and zirconium (Zr). The $Li_2O$—$Al_2O_3$—$SiO_2$—$P_2O_5$—$TiO_2$—$GeO_2$ ceramic may be $(Li_2O)_a(Al_2O_3)_b(SiO_2)_c(P_2O_5)_d(TiO_2)_e(GeO_2)_f$ wherein $0 \leq a \leq 1$, $0 \leq b \leq 1$, $0 \leq c \leq 1$, $0 \leq d \leq 1$, $0 \leq e \leq 1$, and $0 \leq f \leq 1$.

$Li_{1.4}Ti_{1.6}Al_{0.4}P_3O_{12}$ (LTAP) or a $Li_2O$—$Al_2O_3$—$SiO_2$—$P_2O_5$—$TiO_2$—$GeO_2$-based ceramic may be used as the ion conductive inorganic particles.

Since the ion conductive inorganic particles have no or very few grain boundaries, the composite membrane including these ion conductive inorganic particles may provide a lithium conductive path having less resistance. As a result, the conduction and movement of lithium ions may be greatly facilitated, and thus the conductivity of lithium ions and a lithium ion transfer rate may be significantly improved. Also, the flexibility and mechanical strength of the composite membrane may be excellent in comparison to a membrane formed of only inorganic particles.

That the ion conductive inorganic particles have the shape of a single-body particle and are without grain boundaries may be confirmed with a scanning electron microscope (SEM).

An average particle diameter of the ion conductive inorganic particles may be in a range of about 10 micrometers (μm) to about 300 μm, for example about 20 μm to about 200 μm, or for example, about 90 μm to about 125 μm. When the average particle diameter of the ion conductive inorganic particles is within the above range, a composite membrane that contains ion conductive inorganic particles having the shape of a single-body particle and without grain boundaries may be easily obtained by polishing during the preparation of the composite membrane.

The ion conductive inorganic particles may have a relatively uniform size and may maintain the uniform size of the composite membrane. For example, D50 of the ion conductive inorganic particles may be in a range of about 110 μm to about 130 μm, for example about 115 μm to about 125 μm, and D90 thereof may be in a range of about 180 μm to about 200 μm, for example about 185 μm to about 195 μm. Also, D10 thereof may be in a range of about 60 μm to about 80 μm, for example about 65 μm to about 75 μm. Herein, the expressions "D50", "D10", and "D90" respectively denote particle diameters representing about 50 vol %, about 10 vol %, and about 90 vol % in a cumulative distribution curve.

The polymer constituting the composite membrane may be variously selected according to a use of the composite membrane.

When the polymer has suitable barrier properties that block one or more selected from oxygen, carbon dioxide, and moisture, the composite membrane, for example, may have properties for blocking anode corrosive gases. The anode corrosive gases may include water vapor, carbon dioxide, or oxygen. Therefore, the composite membrane may perform a function of one or more of an oxygen permeation barrier layer, a moisture barrier layer, and a carbon dioxide permeation barrier layer.

Examples of the polymer having barrier properties that block one or more selected from oxygen and moisture may be one or more selected from polyvinyl alcohol, polyacrylonitrile, polyimide, an epoxy resin, an acrylic resin, and polyethylene.

According to another embodiment, the composite membrane may be used as an anode protective layer of a lithium secondary battery, such as a lithium-sulfur secondary battery or a water-based lithium-ion secondary battery. In addition, the composite membrane may improve the performance of a lithium-ion battery by separating a cathode and an anode electrolyte, thereby broadening the range of materials that can be used in the lithium-ion battery.

When the composite membrane is used as a protective layer of a lithium-sulfur secondary battery or a water-based lithium-ion secondary battery, the polymer may form the non-ionic conductive region.

Examples of the polymer for forming the composite membrane may be one or more selected from poly(2-vinyl pyridine), polytetrafluoroethylene, a tetrafluoroethylene-hexafluoropropylene copolymer, polychlorotrifluoroethylene, a perfluoroalkoxy copolymer, a fluorinated cyclic ether, polyethylene oxide diacrylate, polyethylene oxide dimethacrylate, polypropylene oxide diacrylate, polypropylene oxide dimethacrylate, polymethylene oxide diacrylate, polymethylene oxide dimethacrylate, a polyalkyldiol diacrylate, a polyalkyldiol dimethacrylate, polydivinylbenzene, polyether, polycarbonate, polyamide, polyester, polyvinyl chloride, polyimide, polycarboxylic acid, polysulfonic acid, polyvinyl alcohol, polysulfone, polystyrene, polyethylene, polypropylene, poly(p-phenylene), polyacetylene, poly(p-phenylene vinylene), polyaniline, polypyrrole, polythiophene, poly(2,5-ethylene vinylene), polyacene, poly(naphthalene-2,6-diyl), polyethylene oxide, polypropylene oxide, polyvinylidene fluoride, a copolymer of vinylidene fluoride and hexafluoropropylene, polyvinyl acetate, poly(vinyl butyral-co-vinyl alcohol-co-vinyl acetate), poly(methyl methacrylate-co-ethyl acrylate), polyacrylonitrile, polyvinyl chloride-co-vinyl acetate, poly(1-vinylpyrrolidone-co-vinyl acetate), polyvinylpyrrolidone, polyacrylate, polymethacrylate, polyurethane, polyvinyl ether, an acrylonitrile-butadiene rubber, a styrene-butadiene rubber, an acrylonitrile-butadiene-styrene rubber, a sulfonated styrene/ethylene-butylene triblock copolymer, a polymer obtained from one or more acrylate monomers selected from ethoxylated neopentyl glycol diacrylate, ethoxylated bisphenol A diacrylate, ethoxylated aliphatic urethane acrylate, ethoxylated alkylphenol acrylate, and alkyl acrylate, polyvinyl alcohol, polyimide, an epoxy resin, and an acrylic resin. A combination comprising copolymers of the above-described polymers, or reaction products thereof, may be used.

An amount of the polymer in the composite membrane may be in a range of about 30 parts by weight to about 95 parts by weight, for example, about 50 parts by weight to about 80 parts by weight, or about 55 parts by weight to about 75 parts by weight, based on 100 parts by weight of the composite membrane.

When the amount of the polymer is within the above range, a composite membrane having excellent lithium ion conductivity, flexibility, and gas barrier properties may be obtained without a decrease in membrane formability of the composite membrane.

A weight-average molecular weight (Mw) of the polymer may be in a range of about 10,000 Da to about 300,000 Daltons (Da), about 20,000 to about 250,000 Da, or about 30,000 Da to about 200,000 Da. The weight-average molecular weight is measured by gel permeation chromatography (GPC). When the weight-average molecular weight of the polymer is within the above range, a composite membrane having excellent lithium ion conductivity and moisture and gas barrier properties may be obtained without a decrease in membrane formability.

The composite membrane may have an top surface and a bottom surface, such as top surface 13 and bottom surface 14 of FIG. 1. About 10 percent to about 90 percent, specifically about 20 percent to about 80 percent, more specifically about 30 percent to about 70 percent of the top surface of the composite membrane may comprise the ion conductive inorganic particles, and 90 percent to 10 percent, specifically about 80 percent to about 20 percent, more specifically about 70 percent to about 30 percent of the top surface of the composite membrane may comprise a polymer of the polymer layer. About 10 percent to about 90 percent, specifically about 20 percent to about 80 percent, more specifically about 30 percent to about 70 percent of the bottom surface of the composite membrane may comprise the ion conductive inorganic particles, and 90 percent to 10 percent, specifically about 80 percent to about 20 percent, more specifically about 70 percent to about 30 percent of the bottom surface of the composite membrane may comprise the polymer of the polymer layer.

An oxygen permeability of the composite membrane, for example, may be in a range of about $5 \times 10^8$ cm$^3$·cm/cm$^2$·s·Pa (wherein cm is centimeters, s is seconds, Pa is pascals) to about $2 \times 10^{13}$ cm$^3$·cm/cm$^2$·s·Pa, for example about $1 \times 10^9$ cm$^3$·cm/cm$^2$·s·Pa to about $2 \times 10^{12}$ cm$^3$·cm/cm$^2$·s·Pa, or about $5 \times 10^9$ cm$^3$·cm/cm$^2$·s·Pa to about $2 \times 10^{11}$ cm$^3$·cm/cm$^2$·s·Pa; and a water vapor permeability thereof may be in a range of about $2 \times 10^{15}$ cm$^3$ cm/cm$^2$ s Pa to about $1 \times 10^{19}$ cm$^3$·cm/cm$^2$·s·Pa, for example about $1 \times 10^{16}$ cm$^3$·cm/cm$^2$·s·Pa to about $5 \times 10^{18}$ cm$^3$·cm/cm$^2$·s·Pa, or about $1 \times 10^{17}$ cm$^3$·cm/cm$^2$·s·Pa to about $1 \times 10^{18}$ cm$^3$·cm/cm$^2$·s·Pa. Resistance of the composite membrane may be improved, ranging from about $1 \times 10^2$ ohms ($\Omega$) to about $9 \times 10^4 \Omega$, for example about $2 \times 10^2 \Omega$ to about $8 \times 10^4 \Omega$, or about $3 \times 10^2 \Omega$ to about $7 \times 10^4 \Omega$.

A density of the composite membrane according to an embodiment may be in a range of about 5 mg/cm$^2$ to about 20 mg/cm$^2$, for example, about 7 mg/cm$^2$ to about 18 mg/cm$^2$, or about 11 mg/cm$^2$ to about 16 mg/cm$^2$. When the above-described composite membrane is used, a lightweight battery may be prepared.

A thickness of the composite membrane may be in a range of about 10 µm to about 200 µm, for example, about 70 µm to about 100 µm. When the thickness of the composite membrane is within the above range, the ionic conductivity and the moisture and gas barrier properties of the composite membrane may be improved.

The composite membrane may further include a porous support.

Any porous support may be used as long as it has internal pores as well as suitable mechanical properties and heat resistance.

For example, the porous support may comprise an olefin-based polymer having suitable chemical resistance and hydrophobicity. Alternatively, a sheet or non-woven fabric formed of glass fibers or polyethylene may be used as the porous support.

Specific examples of the olefin-based polymer may be polyethylene, polypropylene, or a combination thereof. Also, a mixed multilayer material, such as a polyethylene/polypropylene double-layered separator, a polyethylene/polypropylene/polyethylene triple-layered separator, or a polypropylene/polyethylene/polypropylene triple-layered separator, may be used.

Specifically, a polyethylene membrane, a polypropylene membrane, or a combination thereof may be used as the porous support.

A pore diameter of the porous support, for example, may be in a range of about 0.01 µm to about 10 µm, and a thickness thereof, for example, may be in a range of about 5 µm to about 35 µm.

The porous support may include an electrolyte solution containing a lithium salt and an organic solvent.

A concentration of the lithium salt may be in a range of about 0.01 molar (M) to about 5 M, for example, about 0.2 M to about 2 M. When the concentration of the lithium salt is within the above range, the composite membrane may have excellent conductivity.

The lithium salt may act as a source of lithium ions in a battery by being dissolved in a solvent. Examples of the lithium salt may be one or more selected from LiPF$_6$, LiBF$_4$, LiSbF$_6$, LiAsF$_6$, LiN(SO$_2$C$_2$F$_5$)$_2$, Li(CF$_3$SO$_2$)$_2$N, LiC$_4$F$_9$SO$_3$, LiClO$_4$, LiAlO$_2$, LiAlCl$_4$, LiN(C$_x$F$_{2x+1}$SO$_2$)(C$_y$F$_{2y+1}$SO$_2$) (wherein x and y are natural numbers), LiF, LiBr, LiCl, LiOH, LiI, and LiB(C$_2$O$_4$)$_2$ (lithium bis(oxalato) borate, LiBOB).

In addition to the lithium salt, other metal salts, for example, AlCl$_3$, MgCl$_2$, NaCl, KCl, NaBr, KBr, or CaCl$_2$, may be further included.

Hereinafter, a method of preparing a composite membrane, according to an embodiment, will be further disclosed.

First, ion conductive inorganic particles are disposed on, e.g., fixed on, a release film, e.g., a peelable film.

The disposing of the ion conductive inorganic particles on the release film may include providing the ion conductive inorganic particles on the release film and applying pressure to the ion conductive inorganic particles disposed on the release film.

The pressure applied to the ion conductive inorganic particles may vary according to a pressurizing device, a type of the release film, and the ion conductive inorganic particles. For example, the pressure may be in a range of about 2 g/cm$^2$ to about 10 g/cm$^2$, for example about 3 g/cm$^2$ to about 9 g/cm$^2$.

The ion conductive inorganic particles may also be disposed on a substrate or a liquid with an adhesive instead of the release film. Since the adhesive may be included in the composite membrane after removal of the release film, the adhesive may become a part of the composite membrane.

The providing of the ion conductive inorganic material may be performed by a spraying, a doctor blade method, printing, spin coating, spray coating, dip coating, or knife coating.

A size of the ion conductive inorganic particles can influence the ionic conductivity of the composite membrane. Therefore, the size of the ion conductive inorganic particles is appropriately controlled to obtain a uniform particle shape. For this, only the ion conductive inorganic particles having a desired average particle diameter are collected by sieving and used.

The average particle diameter of the ion conductive inorganic particles may be in a range of about 10 µm to about 300 µm, for example, about 90 µm to about 200 µm.

According to an embodiment, a process of milling and sieving the ion conductive inorganic particles may be further performed to obtain the average particle diameter ranging from about 5 µm to about 300 µm, for example about 10 µm to about 250 µm, before the ion conductive inorganic particles are provided to the release film.

A bead mill may be used during the milling. Beads may be used in the milling process, wherein a diameter of the beads, for example, may be in a range of about 0.5 µm to about 2 mm, and a speed of the mill, measured in revolutions per minute (rpm) of a milling machine, for example, may be in a range of about 1,000 rpm to about 2,000 rpm. When the diameter of the beads and the rpm of the milling machine are within the above ranges, the formation of fine LTAP powder may be inhibited.

As a non-limiting example, a material of the beads may include zirconia or alumina.

Any suitable release film may be used. The release film may support the composite membrane and any support that may be used to fix the ion conductive inorganic particles.

The release film may have an adhesive layer on a surface thereof. In an embodiment where the release film has the adhesive layer, the ion conductive inorganic particles may be more easily fixed on the release film.

Examples of the release film may be a polyimide film having an adhesive layer (e.g., Kapton tape), a film prepared by adding a silicone composition and inorganic particles to one or both surfaces of a polyethylene terephthalate layer, or a silicone resin layer-containing film.

A thickness of the release film, for example, may be in a range of about 5 µm to about 20 µm.

Thereafter, a polymer layer is formed on the release film having the ion conductive inorganic particles fixed thereon.

The forming of the polymer layer may be performed by coating a polymer composition for forming a polymer layer, wherein the polymer composition includes a solvent and one or more selected from a polymer and a monomer for forming a polymer.

The monomer for forming a polymer denotes a monomer capable of forming one or more polymers selected from polyvinyl alcohol, polyacrylonitrile, polyimide, an epoxy resin, an acrylic resin, and a polyethylene monomer.

According to another embodiment, examples of the monomer for forming a polymer may be monomers for forming poly(2-vinyl pyridine), polytetrafluoroethylene, a tetrafluoroethylene-hexafluoropropylene copolymer, polychlorotrifluoroethylene, a perfluoroalkoxy copolymer, a fluorinated cyclic ether, polyethylene oxide diacrylate, polyethylene oxide dimethacrylate, polypropylene oxide diacrylate, polypropylene oxide dimethacrylate, polymethylene oxide diacrylate, polymethylene oxide dimethacrylate, a polyalkyldiol diacrylate, a polyalkyldiol dimethacrylate, polydivinylbenzene, polyether, polycarbonate, polyamide, polyester, polyvinyl chloride, polyimide, polycarboxylic acid, polysulfonic acid, polyvinyl alcohol, polysulfone, polystyrene, polyethylene, polypropylene, poly(p-phenylene), polyacetylene, poly(p-phenylene vinylene), polyaniline, polypyrrole, polythiophene, poly(2,5-ethylene vinylene), polyacene, poly(naphthalene-2,6-diyl), polyethylene oxide, polypropylene oxide, polyvinylidene fluoride, a copolymer of vinylidene fluoride and hexafluoropropylene, polyvinyl acetate, poly(vinyl butyral-co-vinyl alcohol-co-vinyl acetate), poly(methyl methacrylate-co-ethyl acrylate), polyacrylonitrile, polyvinyl chloride-co-vinyl acetate, poly (1-vinylpyrrolidone-co-vinyl acetate), polyvinylpyrrolidone, polyacrylate, polymethacrylate, polyurethane, polyvinyl ether, an acrylonitrile-butadiene rubber, a styrene-butadiene rubber, an acrylonitrile-butadiene-styrene rubber, and a sulfonated styrene/ethylene-butylene triblock copolymer, or one or more acrylate monomers selected from an acrylonitrile-butadiene rubber, a styrene-butadiene rubber, an acrylonitrile-butadiene-styrene rubber, a sulfonated styrene/ethylene-butylene triblock copolymer, ethoxylated neopentyl glycol diacylate, ethoxylated bisphenol A diacrylate, ethoxylated aliphatic urethane acrylate, ethoxylated alkylphenol acrylate, and alkyl acrylate.

The method of disposing the polymer composition may be a coating process, and may include casting, dip coating, spray coating, printing, and a doctor blade method. The coating process may include a process of drying to remove a solvent from the polymer composition to form a polymer layer after the polymer composition for forming a polymer layer is coated, or may include the process of drying and a heat treatment for a polymerization reaction of monomers or a process of irradiating light such as ultraviolet (UV) light.

The drying, for example, may be performed at a temperature ranging from about 30° C. to about 85° C., for example about 35° C. to about 80° C. The heat treatment may be changed according to a type of the polymer. However, the heat treatment, for example, may be performed at a temperature ranging from about 60° C. to about 200° C., for example about 70° C. to about 180° C.

Any suitable solvent may be used as the solvent so long as it may dissolve the polymer or the monomer for forming a polymer. For example, one or more selected from methylethylketone, water, acetonitrile, acetone, formamide, N,N-dimethylformamide, tetrahydrofuran, methanol, ethanol, N-methyl-2-pyrrolidone, N,N-dimethyl sulfoxide, 1,3-dioxolane, sulfolane, and dimethyl sulfolane may be used.

An amount of the solvent may be in a range of about 100 parts by weight to about 5,000 parts by weight, based on 100 parts by weight of the polymer or the monomer for forming a polymer. When the amount of the solvent is within the above range, the coating process of the polymer composition for forming a polymer layer may be facilitated.

Thereafter, a composite membrane may be obtained when the release film is removed from the product thus obtained. The composite membrane may be the composite membrane 10 of FIG. 1. As illustrated in FIG. 1, the ion conductive inorganic particle 11 may be thicker than the polymer layer 12. Herein, the ion conductive inorganic particle 11 may have the shape of a single-body particle and may be without grain boundaries, even if a polishing process is not performed.

Subsequently, polishing of the composite membrane, in which the release film is removed, may be further performed. When the polishing is performed, all of the ion conductive inorganic particles may be formed as single-body particles, and the thickness of the ion conductive inorganic particles may be selected as desired.

A method of polishing the ion conductive inorganic particles is not particularly limited. For example, a method of using sandpaper, a method of using chemical mechanical polishing (CMP) abrasives, sand blast, or a method of using a polishing solution may be used.

For example, sandpaper having a grit size of #300 to #5,000 may be used as the sandpaper. Examples of the sandpaper may be sandpapers having a grit size of #500, #1,000, #3,000, and #5,000.

The CMP abrasives, for example, may be composed of polishing particles, such as silica, alumina, and ceria, a dispersion stabilizer, an oxidant, or an additive.

When only polishing one surface of an ion conductive inorganic particle layer in the above-described polishing process, the composite membrane 20 or 30 of FIG. 2 or FIG. 3 may be obtained. The composite membrane 20 of FIG. 2 denotes a state in which a top surface of the ion conductive inorganic particle 21 is polished. The composite membrane 30 of FIG. 3 denotes a state in which only a bottom surface of the ion conductive inorganic particle 31, i.e., a surface on which the ion conductive inorganic particle is in contact with the release film and then separated, is polished. As shown in FIG. 2, an ion conductive particle may protrude from a surface of the composite membrane.

When the ion conductive inorganic particle 41 and the polymer layer 42 are polished to have the same thickness in the polishing process, the composite membrane 40 of FIG. 4 may be obtained.

With respect to the composite membranes 10 to 30 of FIGS. 1 to 3, an area of the surfaces of the ion conductive inorganic particles 11, 21, and 31 in contact with the polymer layer 12, 22, and 32 may be greater than the case of FIG. 4, or the thicknesses of the ion conductive inorganic particles 11, 21, and 31 may be greater than those of the polymer layers 12, 22, and 32.

The composite membrane, as a lithium-ion conductive layer, may protect an anode that may store and release lithium ions, and may function as a protective layer that prevents a reaction of the anode with other materials by selectively transmitting lithium ions. Also, since the protective layer may be formed as a thin film, the resistance thereof may be decreased and ionic conductivity thereof may be improved.

The composite membrane may be used as a protective layer or an oxygen permeation barrier layer of a lithium-air battery, a protective layer of a lithium-sulfur battery, a protective layer and a separator of a water-based lithium-ion battery, or a separator of a fuel cell.

According to another aspect, a lithium-air battery including the above-described composite membrane is provided.

The lithium-air battery includes an anode, a composite membrane, and a cathode for including oxygen as a cathode active material.

The lithium-air battery may use an aqueous electrolyte or a non-aqueous electrolyte as an electrolyte between the cathode and the anode.

When the non-aqueous electrolyte is used as the electrolyte, a reaction mechanism, such as the following Reaction Formula 1, may occur:

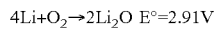

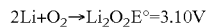           Reaction Formula 1

Lithium derived from the anode during discharge is mixed with oxygen introduced from the cathode to generate lithium oxide, and the oxygen is reduced. In contrast, the lithium oxide is reduced during charge, and the reduced oxygen is oxidized to generate oxygen.

The lithium-air battery may be used as both a lithium primary battery and a lithium secondary battery. Also, the shape of the lithium-air battery is not particularly limited, and the shape thereof may be, for example, a coin type, a button type, a sheet type, a laminated type, a cylindrical type, a flat type, or a horn type. In addition, the lithium-air battery may be applied to provide a large-sized batteries suitable for an electric vehicle.

Figure 5A:
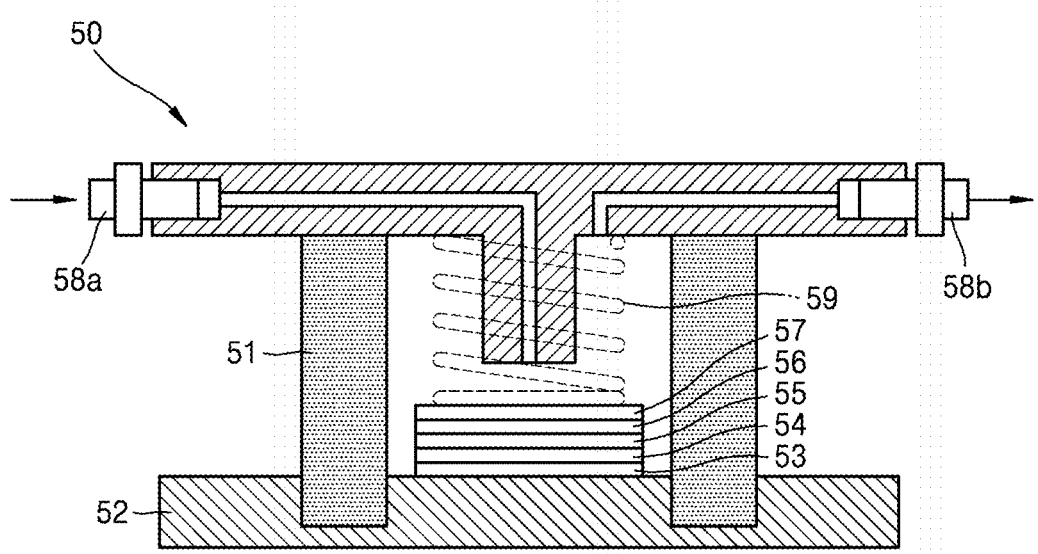
FIG. 5A is a schematic view illustrating a structure of an embodiment of a lithium-air battery.

An embodiment of the lithium-air battery is schematically illustrated in FIG. 5A.

A lithium-air battery 50 has a structure, in which a composite membrane 55 according to an embodiment is disposed between an anode 53 and a cathode 57 including oxygen as an active material. An electrolyte 54 may be disposed between the anode 53 and the composite membrane 55. The anode 53, the electrolyte 54, and the composite membrane 55 constitute a protective anode.

The electrolyte 54 has low resistance per area when combined with the anode 53 and provides excellent conductivity of lithium ions.

A lithium-ion conductive solid electrolyte membrane or a separator may be further included between the anode 53 and the electrolyte 54 or the electrolyte 54 and the composite membrane 55.

The cathode 57 includes a current collector, and a pressing member 59, through which air may be transferred to the cathode 57, and is disposed on the current collector. As illustrated in FIG. 5A, a case formed of an insulating resin material, which includes the cathode 57 and the anode 53, is disposed. Air is supplied to an air inlet 58a and discharged from an air outlet 58b.

The expression "air" used in the present specification is not limited to ambient air, but may include a combination of gases including oxygen, or pure oxygen gas.

An electrolyte 56 is disposed between the composite membrane 55 and the cathode 57.

A lithium-ion conductive solid electrolyte membrane or a separator may be further included between the cathode 57 and the electrolyte 56 or the electrolyte 56 and the composite membrane 55.

The composite membrane 55 is formed on a surface of the anode 53 so as to act as a protective layer that protects lithium of the anode 53 from the electrolyte 56.

The composite membrane 55 may be used as a single layer or multiple layers.

A polymer solid electrolyte may be used as the electrolytes 54 and 56. The polymer solid electrolyte may be polyethylene oxide doped with a lithium salt, and examples of the lithium salt may be $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$.

According to another embodiment, the electrolytes 54 and 56 may be a liquid electrolyte including a solvent and a lithium salt.

One or more selected from an aprotic solvent and water may be included as the solvent.

A carbonate-based, ester-based, ether-based, ketone-based, amine-based, or phosphine-based solvent may be used as the aprotic solvent.

Dimethyl carbonate (DMC), diethyl carbonate (DEC), ethylmethyl carbonate (EMC), dipropyl carbonate (DPC), methylpropyl carbonate (MPC), ethylpropyl carbonate (EPC), methylethyl carbonate (MEC), ethylene carbonate (EC), propylene carbonate (PC), or butylene carbonate (BC) may be used as the carbonate-based solvent.

Methyl acetate, ethyl acetate, n-propyl acetate, dimethyl acetate, methyl propionate, ethyl propionate, γ-butyrolactone, decanolide, valerolactone, mevalonolactone, or caprolactone may be used as the ester-based solvent.

Dibutyl ether, tetraglyme, diglyme, dimethoxyethane, 2-methyltetrahydrofuran, or tetrahydrofuran may be used as the ether-based solvent, and cyclohexanone may be used as the ketone-based solvent.

Also, triethylamine or triphenylamine may be used as the amine-based solvent. Triethylphosphine may be used as the phosphine-based solvent. However, the solvent is not limited thereto, and any suitable aprotic solvent in the art may be used.

Also, nitriles such as compounds of the formula R—CN (wherein R is a hydrocarbon group with a carbon number of about 2 to about 30 having a linear, branched, or cyclic structure, and may include a double-bonded aromatic ring or an ether bond), amides such as dimethylformamide, dioxolanes such as 1,3-dioxolane, or sulfolanes may be used as the aprotic solvent.

The aprotic solvent may be used alone or in a combination. When the aprotic solvent is used in combination with one or more aprotic solvents, a mixing ratio may be appropriately selected according to a battery performance.

Also, the electrolytes 54 and 56 may include an ionic liquid.

Linear or branched, substituted compounds composed of cations, such as ammonium, imidazolium, pyrrolidinium, and piperidinium, and anions, such as $PF_6^-$, $BF_4^-$, $CF_3SO_3^-$, $(CF_3SO_2)_2N^-$, $(C_2F_5SO_2)_2N^-$, and $(CN)_2N^-$, may be used as the ionic liquid.

A portion or all of the electrolytes 54 and 56 may be impregnated in the cathode or the anode.

According to another embodiment, a lithium-ion conductive solid electrolyte membrane may be used as the electrolytes 54 and 56.

Examples of the lithium-ion conductive solid electrolyte membrane may be inorganic materials containing lithium-ion conductive glass, lithium-ion conductive crystals (ceramic or glass-ceramic), or a combination thereof. The lithium-ion conductive solid electrolyte membrane may include an oxide in consideration of chemical stability.

Since high ionic conductivity may be obtained when the lithium-ion conductive solid electrolyte membrane includes a large amount of lithium-ion conductive crystals, the lithium-ion conductive solid electrolyte membrane, for example, may include lithium-ion conductive crystals in an amount of about 50 wt % or more or about 55 wt % or more based on a total weight of the lithium-ion conductive solid electrolyte membrane.

Crystals with a perovskite structure having lithium ion conductivity, such as $Li_3N$, LISICON, and $La_{0.55}Li_{0.35}TiO_3$, $LiTi_2P_3O_{12}$ having a NASICON-type structure, or glass-ceramic precipitating these crystals may be used as the lithium-ion conductive crystals.

The lithium-ion conductive crystals, for example, may be $Li_{1+y}(Al, Ga)_x(Ti, Ge)_{2-x}Si_yP_{3-y}O_{12}$ (wherein 0≤x≤1, 0≤y≤1, for example, 0≤x≤0.4, 0<y≤0.6, or 0.1≤x≤0.3, 0.1<y≤0.4). In order to have high ionic conductivity, the lithium-ion conductive crystals may not include grain boundaries that obstruct ion conduction. For example, since the glass-ceramic almost does not have pores or grain boundaries that obstruct ion conduction, high ionic conductivity as well as excellent chemical stability may be obtained.

Examples of the lithium-ion conductive glass-ceramic may be lithium-aluminum-germanium-phosphate (LAGP), lithium-aluminum-titanium-phosphate (LATP), and lithium-aluminum-titanium-silicon-phosphate (LATSP).

For example, in a case where a parent glass has a $Li_2O$—$Al_2O$—$TiO_2$—$SiO_2$—$P_2O_5$-based composition and the parent glass is crystallized by a heat treatment, a main crystalline phase in this case becomes $Li_{1+x+y}Al_xTi_{2-x}Si_yP_{3-y}O_{12}$ (wherein 0≤x≤1, 0≤y≤1), wherein x and y, for example, may satisfy 0≤x≤0.4 and 0≤y≤0.6, or 0.1≤x≤0.3 and 0.1≤y≤0.4.

Herein, the pores or the grain boundaries that obstruct ion conduction refers to an ionic conduction inhibitor, such as pores or grain boundaries, which may reduce a total conductivity of an inorganic material including lithium-ion conductive crystals to a level of about 1/10 or less of the conductivity of the lithium-ion conductive crystals themselves.

A conductive material may be used as the cathode using oxygen as a cathode active material. The conductive material may be porous. Therefore, any suitable material having porosity and conductivity may be used as the cathode active material without limitation and, for example, a porous carbon-based material may be used. Carbon black, graphite, graphene, activated carbon, and carbon fibers may be used as the carbon-based material.

Also, a metallic conductive material, such as metal fibers and metal meshes, may be used as the cathode active material. Furthermore, metallic powder, such as copper, silver, nickel, or aluminum powder, may be used as the cathode active material. An organic conductive material, such as a polyphenylene derivative, may also be used. The above-described conductive materials may be used alone or in a combination thereof.

A catalyst for oxidation/reduction of oxygen may be added to the cathode. Precious metal-based catalysts such as platinum, gold, silver, palladium, ruthenium, rhodium, and osmium, oxide-based catalysts such as manganese oxide, iron oxide, cobalt oxide, and nickel oxide, or organic metal-based catalysts such as cobalt phthalocyanine may be used as the catalyst. However, the catalyst is not limited thereto, and any suitable material usable as an oxidation/reduction catalyst of oxygen in the art may be used.

Also, the catalyst may be supported in a carrier. The carrier may be formed of oxide, zeolite, a clay mineral, or carbon. The oxide may include one or more oxides of alumina, silica, zirconium oxide, and titanium dioxide. The oxide may be an oxide including one or more metals selected from the group consisting of cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), Nb, molybdenum (Mo), and tungsten (W). The carbon may be carbon black such as Ketjen black, acetylene black, channel black, and lamp black, graphite such as natural graphite, artificial graphite, and expanded graphite, activated carbon, or carbon fibers. However, an embodiment is not limited thereto, and any suitable material usable as a carrier in the art may be used.

The cathode may further include a binder. The binder may include a thermoplastic resin or a thermosetting resin. For example, polyethylene, polypropylene, polytetrafluoroethylene (PTFE), polyvinylidene fluoride (PVDF), a styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, and an ethylene-acrylic acid copolymer may be used alone or in a mixture thereof. However, the binder is not limited thereto, and any material usable as a binder in the art may be used.

The redox catalyst for oxygen, the conductive material, and the binder are mixed, and a cathode slurry is then prepared by adding an appropriate solvent thereto. Then, the cathode, for example, may be prepared by coating a surface of a current collector with the cathode slurry and drying the coated current collector or by compression molding the cathode slurry on a current collector to selectively increase electrode density. Also, the cathode may selectively include lithium oxide. Furthermore, the redox catalyst for oxygen may be selectively omitted.

In order to increase a diffusion rate of oxygen, a porous body in the shape of a net or a mesh may be used or a porous metal plate, such as stainless steel, nickel, and aluminum plates, may be used as the current collector. However, the current collector is not limited thereto, and any suitable material usable as a current collector in the art may be used. The current collector may be coated with an oxidation-resistant metal or alloy coating layer to prevent its oxidation.

An anode including lithium (Li), as the anode of the lithium-air battery, may use a Li metal, a Li metal-based alloy, or an electrode containing a material capable of intercalating and deintercalating Li may be used. However, the anode is not limited thereto, and any suitable material usable as an anode in the art may be used so long as it may include lithium or may intercalate or deintercalate lithium. The anode may determine a capacity of the lithium-air battery.

The anode, for example, may be a lithium metal thin film. Examples of the lithium metal-based alloy may be alloys of lithium and aluminum, tin, magnesium, indium, calcium, titanium, or vanadium.

Also, a separator may be disposed between the cathode and the anode. The separator is not limited so long as it may have a composition which may function within an operational range of the lithium-air battery. Examples of the separator may be a polymer non-woven fabric, such as a polypropylene non-woven fabric or a polyphenylene sulfide non-woven fabric, and a porous film of an olefin-based resin, such as polyethylene or polypropylene. Also, a combination of two or more thereof may be used as the separator.

According to another embodiment, a lithium secondary battery including the composite membrane according to the embodiment is provided. Herein, the lithium secondary battery, for example, may be a lithium-sulfur secondary battery or a lithium-ion secondary battery.

Figure 5B:
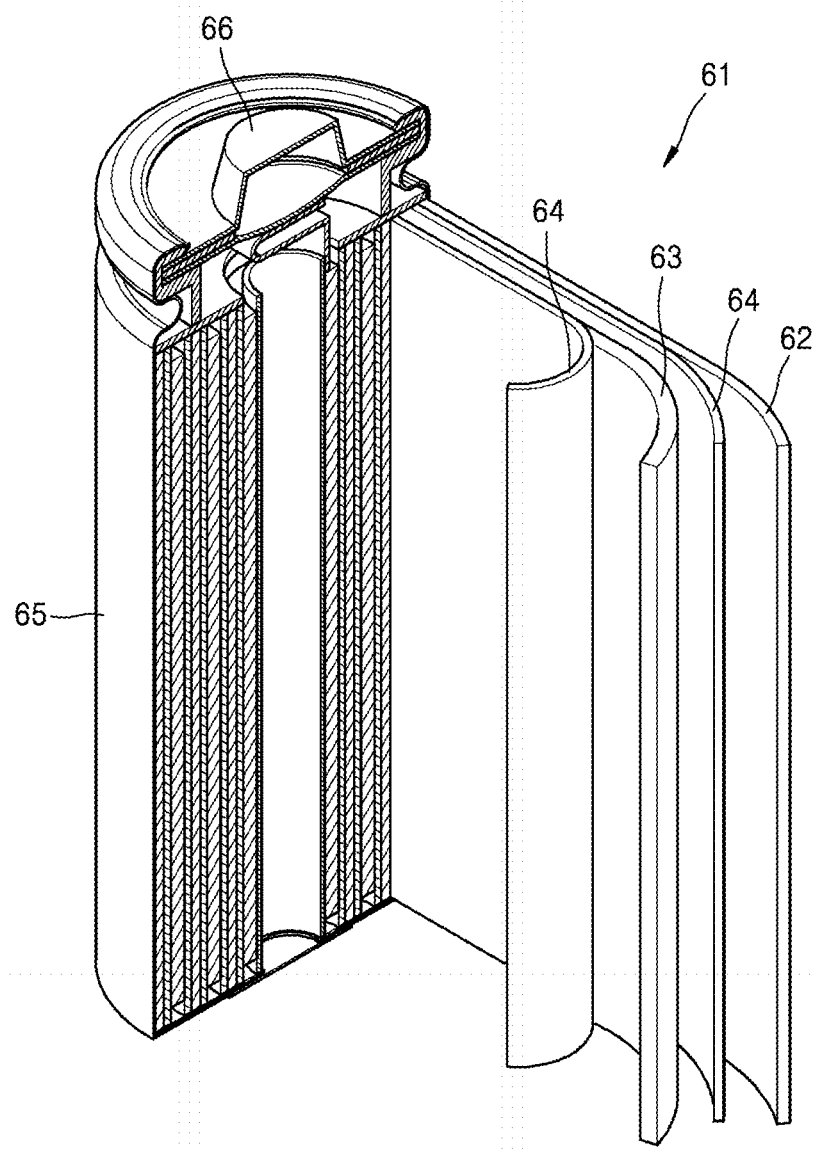
FIG. 5B is a schematic view illustrating a structure of an embodiment of a lithium secondary battery.

A lithium secondary battery 61 using the composite membrane according to the embodiment as a lithium metal protective layer is illustrated in FIG. 5B.

Referring to FIG. 5B, the lithium secondary battery 61 includes a cathode 63, an anode 62, and a separator 64. The cathode 63, the anode 62, and the separator 64 are wound or folded to be contained in a battery case 65. Subsequently, an organic electrolyte solution is injected into the battery case 65 and the lithium secondary battery 61 is completed by being sealed with a cap assembly 66.

The battery case 65 may be a cylindrical type as illustrated in FIG. 5B, or may be a prismatic or thin-film type. For example, the lithium secondary battery 61 may be a thin-film type battery.

The separator 64 is disposed between the cathode 63 and the anode 62 such that a battery structure may be formed. The battery structure is stacked in a bi-cell structure, and then impregnated in an organic electrolyte solution. A lithium-ion polymer battery is completed when the product thus obtained is contained in a pouch and sealed.

Any polymer may be used as the polymer contained in the composite membrane so long as it may protect a lithium anode. Examples of the polymer may be one or more selected from poly(2-vinyl pyridine), polytetrafluoroethylene, a tetrafluoroethylene-hexafluoropropylene copolymer, polychlorotrifluoroethylene, a perfluoroalkoxy copolymer, a fluorinated cyclic ether, polyethylene oxide diacrylate, polyethylene oxide dimethacrylate, polypropylene oxide diacrylate, polypropylene oxide dimethacrylate, polymethylene oxide diacrylate, polymethylene oxide dimethacrylate, a polyalkyldiol diacrylate, a polyalkyldiol dimethacrylate, polydivinylbenzene, polyether, polycarbonate, polyamide, polyester, polyvinyl chloride, polyimide, polycarboxylic acid, polysulfonic acid, polyvinyl alcohol, polysulfone, polystyrene, polyethylene, polypropylene, poly(p-phenylene), polyacetylene, poly(p-phenylene vinylene), polyaniline, polypyrrole, polythiophene, poly(2,5-ethylene vinylene), polyacene, poly(naphthalene-2,6-diyl), polyethylene oxide, polypropylene oxide, polyvinylidene fluoride, a copolymer of vinylidene fluoride and hexafluoropropylene, polyvinyl acetate, poly(vinyl butyral-co-vinyl alcohol-co-vinyl acetate), poly(methyl methacrylate-co-ethyl acrylate), polyacrylonitrile, polyvinyl chloride-co-vinyl acetate, poly (1-vinylpyrrolidone-co-vinyl acetate), polyvinylpyrrolidone, polyacrylate, polymethacrylate, polyurethane, polyvinyl ether, an acrylonitrile-butadiene rubber, a styrene-butadiene rubber, an acrylonitrile-butadiene-styrene rubber, a sulfonated styrene/ethylene-butylene triblock copolymer, a polymer obtained from one or more acrylate monomers selected from ethoxylated neopentyl glycol diacylate, ethoxylated bisphenol A diacrylate, ethoxylated aliphatic urethane acrylate, ethoxylated alkylphenol acrylate, and alkyl acrylate, polyvinyl alcohol, polyimide, an epoxy resin, and an acrylic resin.

A carbon material may be used as a material able to reversibly intercalate/deintercalate the lithium ions, i.e., an anode active material of the anode in the lithium-sulfur secondary battery.

Any suitable carbon-based anode active material that is used in a lithium-sulfur secondary battery may be used as the carbon material. Examples of the carbon material may be crystalline carbon, amorphous carbon, or a mixture thereof. Also, examples of a material capable of reversibly forming a lithium-containing compound by reacting with the lithium ions may be tin oxide ($SnO_2$), titanium nitrate, and silicon (Si). However, an embodiment is not limited thereto. An alloy of lithium and a metal selected from sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn) may be used as the lithium alloy.

In the lithium-sulfur secondary battery, elemental sulfur (Sa), an elemental sulfur-containing compound, or a combination thereof may be used as a cathode active material of the cathode. One or more selected from $Li_2S_n$ (wherein n≥1), Li$_2$S$_n$ (wherein n≥1) dissolved in catholyte, an organic sulfur compound, and a carbon-sulfur polymer ((C$_2$S$_x$)$_n$, where x is about 2.5 to about 50, n≥2) may be used as the elemental sulfur-containing compound.

In the lithium-ion secondary battery, a compound enabling reversible intercalation and deintercalation of lithium ions (lithiated intercalation compound) may be used as a cathode active material of the cathode. The cathode active material may include one or more selected from lithium cobalt oxide, lithium nickel cobalt manganese oxide, lithium nickel cobalt aluminum oxide, lithium iron phosphate, and lithium manganese oxide. However, the cathode active material is not limited thereto and any suitable cathode active material may be used as long as it is used in the art.

Examples of the cathode active material may be one or more selected from lithium cobalt oxide (e.g., LiCoO$_2$); a lithium nickel oxide of the Formula LiNiO$_2$; a lithium manganese oxide such as a compound of the Formulae Li$_{1+x}$Mn$_{2-x}$O$_4$ (wherein x is about 0 to about 0.33), LiMnO$_3$, LiMn$_2$O$_3$, and LiMnO$_2$; a lithium copper oxide of the Formula Li$_2$CuO$_2$; a lithium iron oxide of the Formula LiFe$_3$O$_4$; a lithium vanadium oxide of the Formula LiV$_3$O$_8$; a copper vanadium oxide of the Formula Cu$_2$V$_2$O$_7$; a vanadium oxide of the Formula V$_2$O$_5$; a lithium nickel oxide of the Formula LiNi$_{1-x}$M$_x$O$_2$ (wherein M is Co, Mn, Al, Cu, Fe, Mg, boron (B), or gallium (Ga), and x is about 0.01 to about 0.3); a lithium manganese complex oxide of the Formula LiMn$_{2-x}$M$_x$O$_2$ (wherein M=Co, Ni, Fe, Cr, zinc (Zn) or tantalum (Ta), and x is about 0.01 to about 0.1) or Li$_2$Mn$_3$MO$_8$ (wherein M is Fe, Co, Ni, Cu, or Zn); lithium manganese oxide in which a portion of Li of LiMn$_2$O$_4$ is substituted with alkaline earth metal ions; disulfide compounds; and iron molybdenum oxide of Chemical Formula Fe$_2$(MoO$_4$)$_3$.

Also, a carbon-based material, silicon, silicon oxide, a silicon-based alloy, a silicon-carbon-based material composite, tin, a tin-based alloy, a tin-carbon composite, metal oxide, or a combination thereof may be used as the cathode active material.

The carbon-based material may include carbon, graphite, or carbon nanotubes.

In the anode of the lithium-ion secondary battery, examples of the anode active material may be one or more selected from Si, SiO$_x$ (wherein 0<x<2, for example, 0.5<x<1.5), Sn, SnO$_2$, a silicon-containing metal alloy, and a mixture thereof. One or more selected from the group consisting of Al, Sn, silver (Ag), Fe, Bi, Mg, Zn, indium (In), germanium (Ge), lead (Pb), and titanium (Ti) may be used as a metal that may form the silicon-containing metal alloy.

The anode active material may include metal/semi-metal alloyable with lithium, an alloy thereof, or an oxide thereof. Examples of the metal/semi-metal alloyable with lithium may be Si, Sn, Al, Ge, Pb, Bi, Sb, a Si—Y alloy (wherein Y is alkaline metal, alkaline earth metal, a group 13 element, a group 14 element, transition metal, a rare earth element, or a combined element thereof, and is not Si), a Sn—Y alloy (wherein Y is alkaline metal, alkaline earth metal, a Group 13 element, a Group 14 element, transition metal, a rare earth element, or a combined element thereof, and is not Sn), MnO$_x$ (where 0<x≤2), etc. Examples of the element Y may be Mg, Ca, Sr, Ba, Ra, scandium (Sc), yttrium (Y), Ti, Zr, hafnium (Hf), rutherfordium (Rf), V, Nb, Ta, dubnium (Db), Cr, Mo, W, seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, Ag, gold (Au), Zn, cadmium (Cd), B, Al, Ga, Sn, In, Ge, phosphorus (P), arsenic (As), Sb, Bi, sulfur (S), selenium (Se), Te, polonium (Po), or a combination thereof. For example, the oxide of the metal/semi-metal alloyable with lithium may be lithium titanate, vanadium oxide, lithium vanadium oxide, SnO$_2$, and SiO$_x$(wherein 0<x<2).

For example, the anode active material may include one or more elements selected from Group 13 elements, Group 14 elements, and Group 15 elements of the Periodic Table.

For example, the anode active material may include one or more elements selected from Si, Ge, and Sn.

The anode active material may be a mixture of a carbon-based material and one or more selected from silicon, silicon oxide, and a silicon-containing metal alloy, or a composite of a carbon-based material and one or more selected from silicon, silicon oxide, and a silicon-containing metal alloy.

For example, the shape of the anode active material may be a simple particle shape and may be a nanostructure having nanoscale dimensions. For example, the anode active material may have various shapes such as shapes of nano particles, nanowires, nanorods, nanotubes, and nanobelts.

A mixed multilayer material, such as a polyethylene/polypropylene double-layered separator, a polyethylene/polypropylene/polyethylene triple-layered separator, or a polypropylene/polyethylene/polypropylene triple-layered separator, may be used as the separator disposed between the cathode and the anode.

The electrolyte solution used in the lithium secondary battery may include an organic solvent and a lithium salt.

Examples of the organic solvent may be one or more solvents selected from benzene, fluorobenzene, toluene, dimethylformamide, dimethylacetate, trifluorotoluene, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylpropyl carbonate, methyl propionate, ethyl propionate, methyl acetate, ethyl acetate, propyl acetate, dimethoxyethane, 1,3-dioxolane, diglyme, tetraglyme, ethyl carbonate, propyl carbonate, γ-butyrolactone, and sulfolane.

One or more lithium salts selected from lithium hexafluorophosphate (LiPF$_6$), lithium tetrafluoroborate (LiBF$_4$), lithium hexafluoroarsenate (LiAsF$_6$), lithium perchlorate (LiClO$_4$), lithium trifluoromethane sulfonate (LiSO$_3$CF$_3$), lithium bis(trifluoromethyl)sulfonimide (LiN(SO$_2$CF$_3$)$_2$), and lithium bis(perfluoroethylsulfonyl)imide (LiN(SO$_2$C$_2$F$_5$)$_2$) may be used as the lithium salt.

In the electrolyte solution, a concentration of the lithium salt may be about 0.01 M to about 5 M, for example, about 0.1 M to about 2.0 M.

With respect to the above-described lithium secondary battery, such as the lithium-sulfur secondary battery and the lithium-ion secondary battery, the lithium anode is protected so that a side reaction between the lithium anode and the electrolyte solution may not only be inhibited, but lithium ion conductivity may also be improved. Therefore, the conductivity and lifetime characteristics of the lithium secondary battery may be improved.

Hereinafter, the present disclosure will be described in more detail, according to the following examples. However, the scope of the present disclosure is not limited thereto.

Examples

Example 1: Preparation of Composite Membrane

A lithium-titanium-aluminum-phosphate (LTAP: Li$_{1.4}$Ti$_{1.6}$Al$_{0.4}$P$_3$O$_{12}$) membrane (Ohara glass, Ohara Corporation) was milled and the milled powder thus obtained was sieved using sieves respectively having an opening of about 90 micrometers (μm) and about 125 μm to prepare LTAP particles having a diameter ranging from about 90 μm to about 125 μm.

A Kapton tape (about 2.5×2.5 cm$^2$) was coated with the LTAP particles. Pressure was applied to the LTAP particles on the Kapton tape to fix the LTAP particles on the Kapton tape.

A large amount of the LTAP particles that were not adhered to the Kapton tape was removed, and an about 3 weight percent (wt %) polyvinyl alcohol aqueous solution was then cast on the product thus obtained. Subsequently, the resulting product was dried at room temperature for about 5 hours and at about 60° C. for about 2 hours.

A dried composite membrane was separated from the Kapton tape and an about 70 μm thick composite membrane was obtained by polishing the dried composite membrane using sandpapers having a grit size of #500, #1,000, #3,000, and #5,000.

An amount of the polyvinyl alcohol in the composite membrane was about 68 parts by weight, based on 100 parts by weight of a total weight of the composite membrane.

Example 2: Preparation of Composite Membrane

A composite membrane was obtained in the same manner as in Example 1 except that a thickness of the composite membrane was changed to about 100 μm.

Example 3: Preparation of Composite Membrane

A composite membrane was obtained in the same manner as in Example 1 except that a thickness of the composite membrane was changed to about 120 μm.

Example 4: Preparation of Composite Membrane

A composite membrane was obtained in the same manner as in Example 1 except that an epoxy resin (EP330, Cemedine Co., Ltd.) was used instead of the about 3 wt % polyvinyl alcohol aqueous solution.

An amount of the epoxy resin in the composite membrane was about 63 parts by weight, based on 100 parts by weight of a total weight of the composite membrane.

Comparative Example 1: Preparation of LTAP Membrane

An LTAP membrane (Ohara glass) having a thickness of about 260 μm was used.

Comparative Example 2: Preparation of PVA Membrane

A polyvinyl alcohol (PVA) membrane having a thickness of about 100 μm was used.

Comparative Example 3: Preparation of PVA/LTAP Membrane

An LTAP membrane was coated with an about 3 wt % PVA aqueous solution and the coated LTAP membrane was dried at about 20° C. to prepare a PVA/LTAP membrane having a total thickness of about 300 μm.

Comparative Example 4: Preparation of Membrane Structure

An LTAP membrane (Ohara glass) was milled and the milled powder thus obtained was sieved using sieves respectively having an opening of about 90 μm and about 125 μm to prepare LTAP particles having a diameter ranging from about 90 μm to about 125 μm.

A Teflon membrane was coated with the LTAP particles. Thereafter, the coated Teflon membrane was pressurized.

An about 3 wt % polyvinyl alcohol solution was cast on the product thus obtained. Subsequently, the resulting product was dried at room temperature for about 5 hours and at about 60° C. for about 2 hours.

A dried composite membrane was separated from the Teflon membrane and an about 70 μm thick membrane structure was obtained by polishing the dried composite membrane using sandpaper having a grit size of #1,000.

An amount of the polyvinyl alcohol in the composite membrane was about 80 parts by weight based on 100 parts by weight of a total weight of the composite membrane.

When the membrane structure was formed according to Comparative Example 4, grain boundaries in the LTAP particles were observed, different from the cases of Examples 1 to 4. According to the results of the measurement of resistance of the membrane, the measurement itself was impossible because the resistance was excessively high.

Comparative Example 5: Preparation of Membrane Structure

An LTAP membrane (Ohara glass) was milled and the milled powder thus obtained was sieved using sieves respectively having an opening of about 90 μm and about 125 μm to prepare LTAP particles having a diameter ranging from about 90 μm to about 125 μm.

About 150 mg of the LTAP particles was mixed in an about 3 wt % polyvinyl alcohol solution which was obtained by adding about 1450 parts by weight of water to about 150 parts by weight of PVA. A Teflon membrane was coated with the mixed solution thus obtained. Thereafter, the resulting product was dried at about 20° C. for about 5 hours and at about 60° C. for about 2 hours.

A dried composite membrane was separated from the Teflon membrane to obtain a membrane structure including a mixture of the LTAP particles and PVA.

An amount of the polyvinyl alcohol in the composite membrane was about 80 parts by weight based on 100 parts by weight of a total weight of the composite membrane.

Preparation Example 1: Preparation of Lithium Symmetric Cell

About 1.38 grams (g) of polyethylene oxide powder (weight-average molecular weight of about 100,000 Da, Aldrich) and about 0.9 g of Li(CF$_3$SO$_2$)$_2$N (LiTFSI, Wako) were dispersed in about 100 mL of an acetonitrile (AN) solvent, and the dispersed solution thus obtained was stirred for about 24 hours to prepare a composition for forming an electrolyte.

The stirred composition for forming an electrolyte was cast on a Teflon dish and dried at about 20° C. for about 24 hours to remove the AN solvent. Then, the Teflon dish was dried at 60° C. for about 12 hours in vacuum to obtain a PEO$_{10}$LiTFSI polymer electrolyte (hereinafter, referred to as "PEO polymer electrolyte"). An average thickness of the polymer electrolyte was about 60 μm.

A battery structure (lithium metal/PEO polymer electrolyte/PVA-LTAP composite membrane/PEO polymer electrolyte/lithium metal) was formed by disposing lithium metal on one side of the PEO polymer electrolyte (weight-average molecular weight: about $1\times10^5$), stacking the composite membrane (PVA-LTAP) of Example 1 on the other side of the PEO polymer electrolyte, and stacking a PEO polymer electrolyte on the composite membrane of Example 1.

Preparation Examples 2 to 4: Preparation of Lithium Symmetric Cells

Lithium symmetric cells were prepared in the same manner as in Example 1 except that the composite membranes of Examples 2 to 4 were respectively used instead of the composite membrane of Example 1.

Preparation Example 5: Preparation of Lithium-Air Battery

Lithium metal was disposed on one side of a PEO polymer electrolyte (weight-average molecular weight: about $1\times10^5$), and a polyethylene (PE) separator (Celgard 2400 or 2300, Hoechst Celanese Corp.) was stacked on the other side of the PEO polymer electrolyte.

The composite membrane (PVA-LTAP) of Example 1 was stacked on the PE separator and a PEO polymer electrolyte was stacked on the composite membrane of Example 1.

Figure 18:
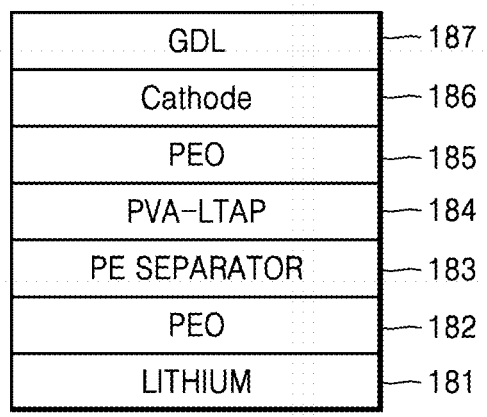
FIG. 18 illustrates a cross section of a battery prepared according to Preparation Example 5.

A cathode was disposed on a side of the PEO polymer electrolyte stacked on the composite membrane. The cathode was prepared by mixing about 1 part by weight of carbon aerogels (ENEN) with about 6 parts by weight of the PEO polymer electrolyte. Then, a battery structure illustrated in FIG. 18 was obtained by disposing a gas diffusion layer (GDL) 187 on a side of the cathode 186. The battery structure illustrated in FIG. 18 further includes lithium 181, the PEO polymer electrolyte 112, PE separator 183, the composite membrane 184, and a second layer of the PEO polymer electrolyte 185.

A lithium-air battery was prepared by forming a nickel electrode on the battery structure obtained according to the above-described processes.

Comparative Preparation Example 1: Preparation of Lithium Symmetric Cell

A lithium symmetric cell was prepared in the same manner as in Example 1 except that the membrane of Comparative Example 1 was used instead of the composite membrane of Example 1.

Comparative Preparation Examples 2 to 5: Preparation of Lithium Symmetric Cells

Lithium symmetric cells were prepared in the same manner as in Example 1 except that the membranes of Comparative Examples 2 to 5 were respectively used instead of the composite membrane of Example 1.

Evaluation Example 1: Scanning Electron Microscope (SEM) Analysis

1) SEM analysis of Example 1

Figure 6:
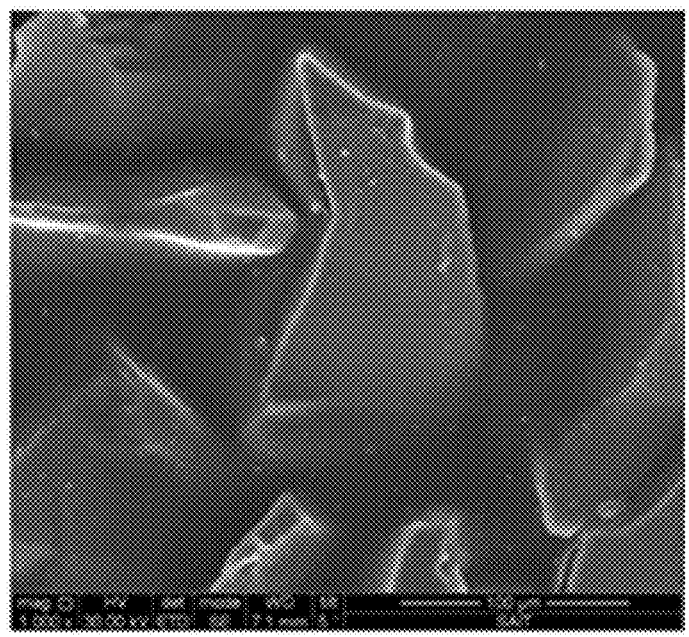
FIG. 6 and FIG. 7 are each a scanning electron microscope (SEM) micrograph of a surface of a composite membrane prepared according to Example 1.
Figure 7:
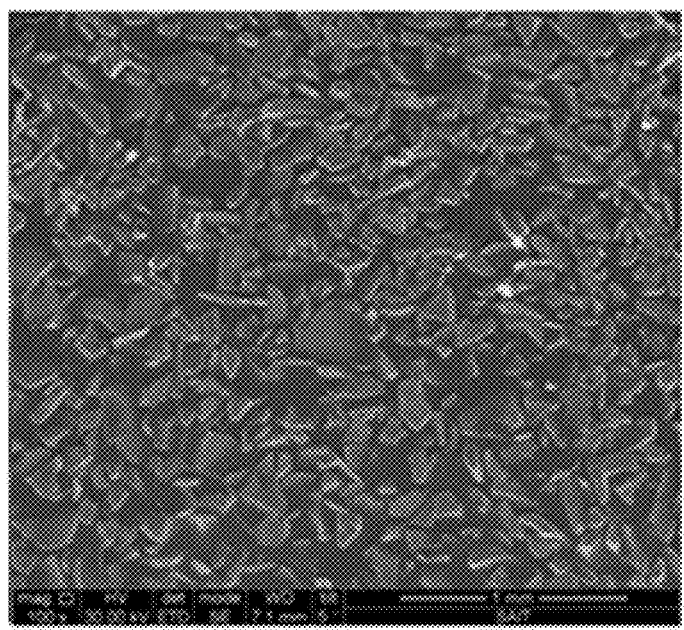

The composite membrane prepared according to Example 1 was analyzed using a scanning electron microscope and the results thereof are presented in FIGS. 6 and 7.

FIGS. 6 and 7 are SEM micrographs of surfaces of the composite membrane prepared according to Example 1. Referring to FIGS. 6 and 7, it may be understood that LTAP particles were uniformly dispersed in the composite membrane.

Figure 8:
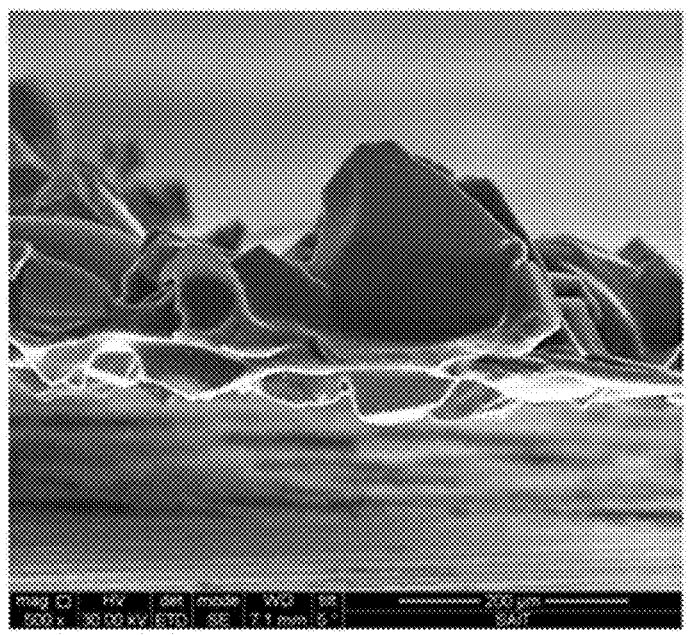
FIG. 8 is an SEM micrograph of a cross section of a composite membrane before polishing the composite membrane in Example 1.
Figure 9:
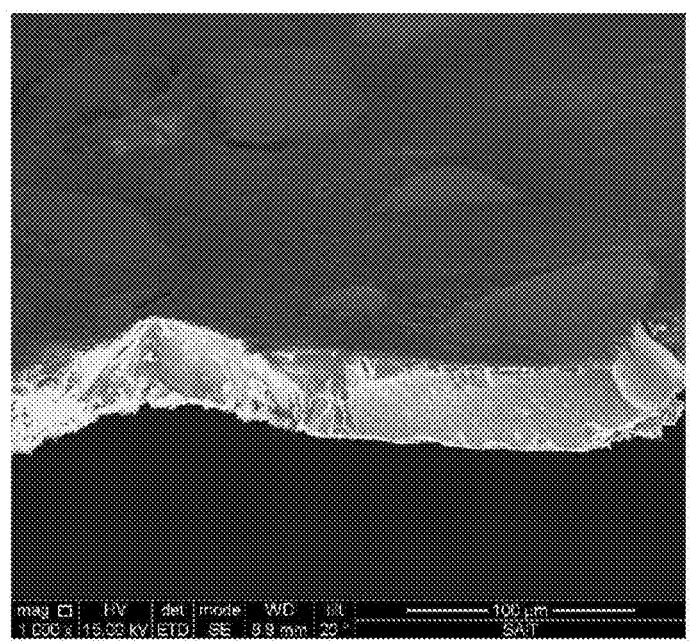
FIG. 9 is an SEM micrograph of a cross section of a composite membrane after polishing the composite membrane in Example 1.

FIGS. 8 and 9 respectively illustrate cross sections of the composite membrane of Example 1 before and after polishing the composite membrane during the preparation of the composite membrane.

As illustrated in FIG. 8, it may be understood that LTAP particles protruded to the outside before the polishing of the composite membrane. After the composite membrane was polished, it may be confirmed that the LTAP particles were included in the shape of a one-body particle without grain boundaries by being polished as illustrated in FIG. 9.

2) SEM analysis of Comparative Example 5

Figure 17:
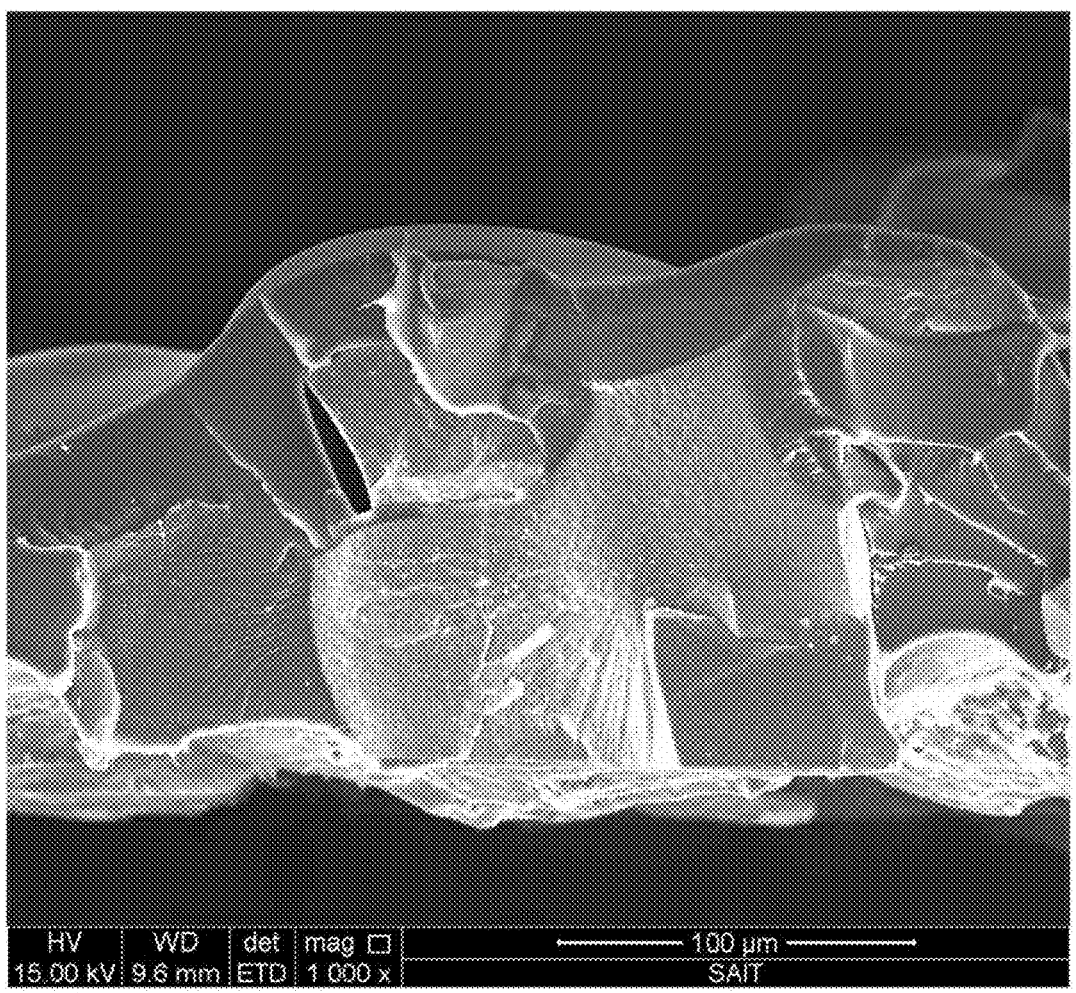
FIG. 17 is an SEM micrograph of a membrane structure according to Comparative Example 5.

The composite membrane prepared according to Comparative Example 5 was analyzed by using an SEM and the results thereof are presented in FIG. 17.

As illustrated in FIG. 17, it may be understood that LTAP particles overlapped in the composite membrane of Comparative Example 5.

Evaluation Example 2: Resistance and Impedance Measurements

1) Examples 1 to 4 and Comparative Examples 1 to 3

Resistances of the composite membranes of Examples 1 to 4 and Comparative Examples 1 to 3 were measured. The results thereof are presented in Table 1 below.

TABLE 1

| Category | Composition | Membrane thickness (μm) | Resistance (Ω) |
| --- | --- | --- | --- |
| Example 1 | PVA-LTAP | 70 | $4.8 \times 10^2$ |
| Example 2 | PVA-LTAP | 100 | $6.5 \times 10^2$ |
| Example 3 | PVA-LTAP | 120 | $1.7 \times 10^3$ |
| Example 4 | Epoxy resin-LTAP | 70 | $6.6 \times 10^3$ |
| Comparative Example 1 | LTAP | 260 | $9.2 \times 10^2$ |
| Comparative Example 2 | PVA | 100 | $3.1 \times 10^9$ |
| Comparative Example 3 | PVA/LTAP | 300 | $6.0 \times 10^9$ |
| Comparative Example 4 | PVA-LTAP | 70 | No measurement |

Referring to Table 1, it may be understood that thicknesses of the composite membranes according to Examples 1 to 4 were less than those of the membrane structures of Comparative Examples 1 and 3 and resistances of the composite membranes according to Examples 1 to 4 were decreased. Since resistance of the membrane of Comparative Example 4 was excessively high, the resistance was greater than the capability of the instrumentation.

2) Preparation Examples 1 to 3 and Comparative Preparation Example 1

Impedance characteristics of the lithium symmetric cells prepared according to Preparation Examples 1 to 3 and Comparative Preparation Example 1 were evaluated.

An impedance analyzer used was Material Mates 7260 by Material Mates. Also, an operation temperature of the cells was maintained at about 60° C. and the results of impedance analyses according to storage time are presented in FIG. 10A. The impedance was evaluated from about 0.1 Hertz (Hz) to about 1,000,000 Hz at an open circuit voltage under the condition of applying an alternating current (AC) voltage of about 5 mV, and each profile is shown as a function of the real part and the imaginary part of the impedance.

Figure 10A:
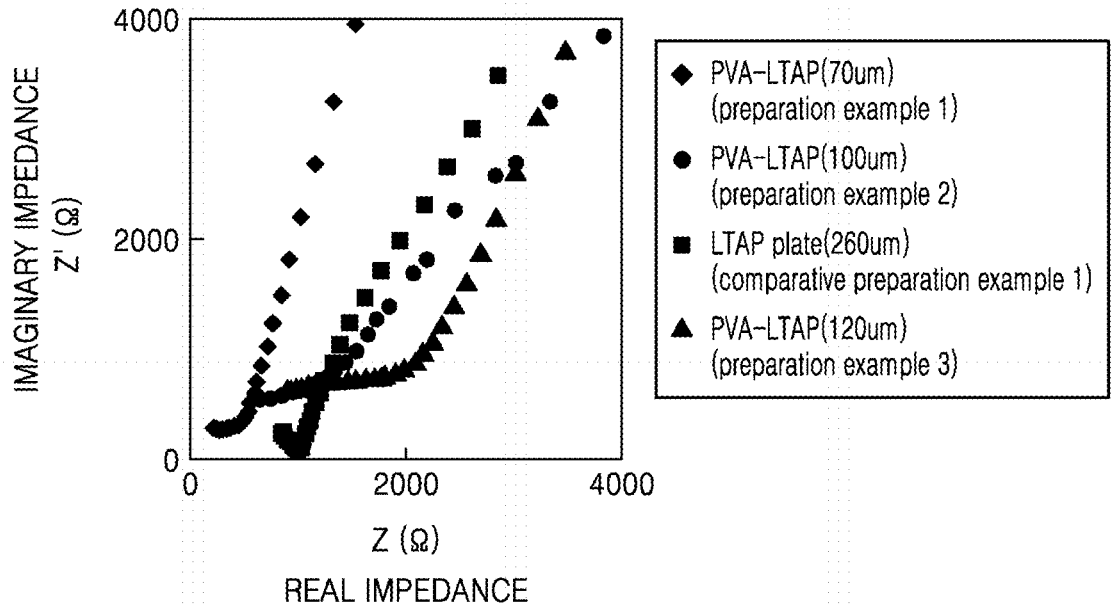
FIG. 10A is a graph of imaginary impedance (Z', ohms, $\Omega$) versus real impedance (Z, ohms, $\Omega$) illustrating impedance characteristics of composite membranes of Preparation Examples 1 to 3 and a membrane structure according to Comparative Preparation Example 1.

Referring to FIG. 10A, it may be understood that the impedance characteristics of the lithium symmetric cells of Preparation Examples 1 to 3 were excellent.

3) Preparation Examples 1 to 3 and Comparative Preparation Examples 1 and 5

Impedance characteristics of the lithium symmetric cells prepared according to Preparation Examples 1 to 3 and Comparative Preparation Examples 1 and 5 were evaluated.

An impedance analyzer used was Material Mates 7260 by Material Mates. Also, an operation temperature of the cells was maintained at about 60° C. and the results of impedance analyses according to storage time are presented in FIG. 10B. The impedance was evaluated from about 0.1 Hz to about 1,000,000 Hz at an open circuit voltage under the condition of applying an alternating current (AC) voltage of about 5 mV, and each profile is shown as a function of the real part and the imaginary part of the impedance.

Figure 10B:
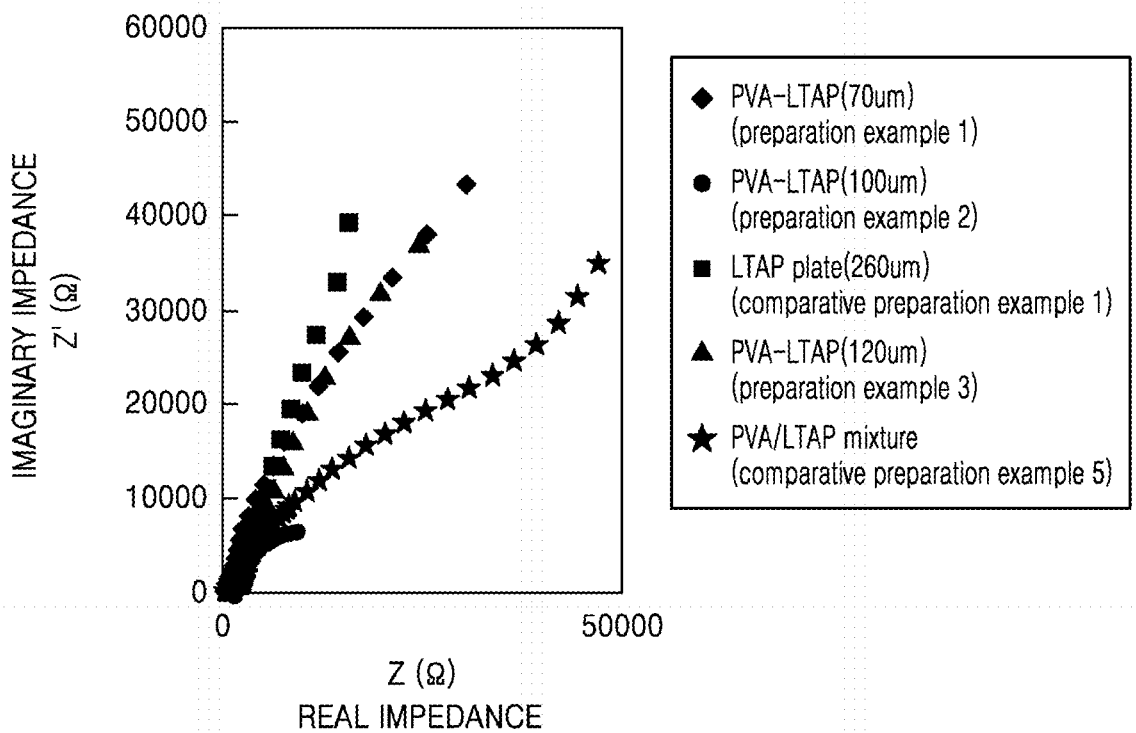
FIG. 10B is a graph of imaginary impedance (Z', ohms, $\Omega$) versus real impedance (Z, ohms, $\Omega$) illustrating impedance characteristics of the composite membranes of Preparation Examples 1 to 3 and membrane structures according to Comparative Preparation Examples 1 and 5.

Referring to FIG. 10B, it may be understood that conductivity characteristics of the lithium symmetric cells of Preparation Examples 1 to 3 were excellent.

Evaluation Example 3: Weight Measurement

Weights of the composite membranes of Examples 1 and 2 and Comparative Examples 1 and 2 were measured.
The results thereof are presented in Table 2 below.

TABLE 2

| Category | Composition | Membrane thickness (μm) | Weight per unit area (mg/cm$^2$) |
| --- | --- | --- | --- |
| Example 1 | PVA-LTAP | 70 | 11 |
| Example 2 | PVA-LTAP | 100 | 16 |
| Comparative Example 1 | LTAP | 260 | 88 |
| Comparative Example 2 | PVA | 100 | 7 |

As illustrated in Table 2, it may be understood that the composite membranes of Examples 1 and 2 had a lower weight than Comparative Example 1.

Evaluation Example 4: Moisture Barrier Property

Moisture barrier properties of symmetric swage-lock type, i.e., compression fitting-type (Swagelok®), lithium batteries prepared as described below were evaluated.

About 1.38 g of polyethylene oxide powder (weight-average molecular weight of about 100,000, Aldrich) and about 0.9 g of Li(CF$_3$SO$_2$)$_2$N (LiTFSI, Wako) were dispersed in about 100 mL of an AN solvent, and the dispersed solution thus obtained was stirred for about 24 hours to prepare a composition for forming an electrolyte.

The stirred composition for forming an electrolyte was cast on a Teflon dish and dried at about 20° C. for about 24 hours to remove the AN solvent. Then, the Teflon dish was dried at 60° C. for about 12 hours in vacuum to obtain a PEO polymer electrolyte. An average thickness of the polymer electrolyte was about 60 μm.

Lithium metal was disposed on one side of the PEO polymer electrolyte (weight-average molecular weight: about 1×10$^5$ Da), and a PE separator (Celgard 2400 or 2300, Hoechst Celanese Corp.) was stacked on another side of the PEO polymer electrolyte.

Battery structure A 110 (see FIG. 11) was formed by stacking the composite membrane 114 (PVA-LTAP) of Example 1 on the PE separator 113 and stacking a PEO polymer electrolyte 112 on the composite membrane of Example 1. The PEO polymer electrolyte 112 was on lithium 111, and a second layer of the PEO polymer electrolyte 115 was on the composite membrane 114.

Figure 13:
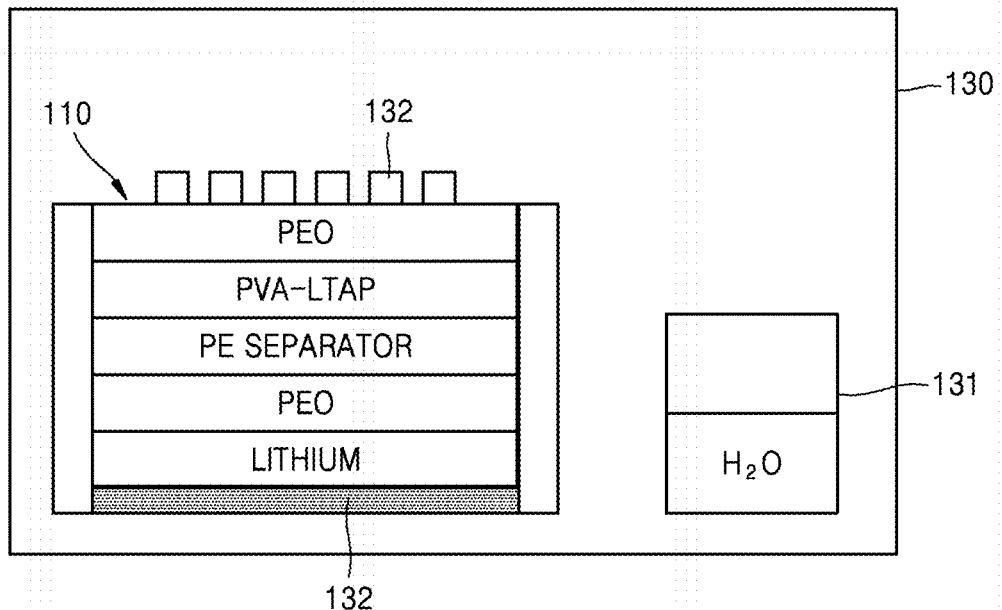
FIG. 13 illustrates a configuration of a compression fitting-type battery according to Evaluation Example 4.

As illustrated in FIG. 13, symmetric swage-lock type battery A was prepared by forming nickel electrodes 132 on the battery structure A 110 (see FIG. 11) obtained according to the above-described processes.

For the comparison with the swage-lock type battery A, symmetric swage-lock type battery B was prepared as described below.

Figure 11:
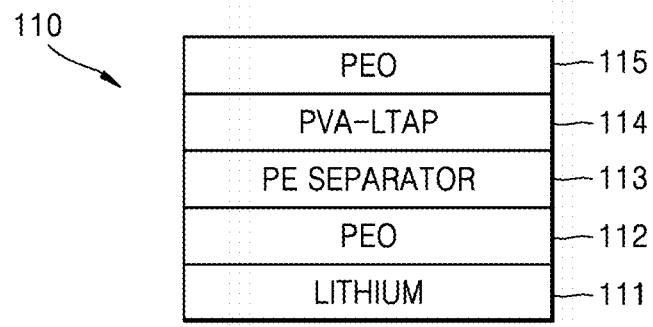
FIG. 11 illustrates a structure of a symmetric compression fitting-type (Swagelok®) battery A according to Evaluation Example 4.
Figure 12:
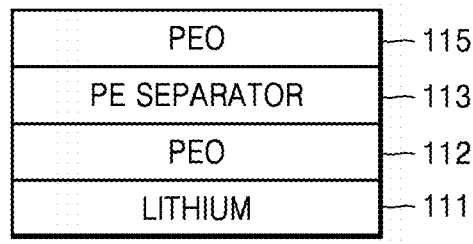
FIG. 12 illustrates a structure of a symmetric compression fitting-type battery B according to Evaluation Example 4.

First, battery structure B of FIG. 12 was prepared in the same manner as in the preparation of the battery structure A of FIG. 11 except that the composite membrane of Example 1 was not used. The battery structure B of FIG. 12 includes lithium 111, the PEO polymer electrolyte 112, the PE separator 113, and the second layer of the PEO polymer electrolyte 115.

Thereafter, swage-lock type battery B was prepared in the same manner as in the preparation of the swage-lock type battery A except that the battery structure B of FIG. 12 was used instead of the battery structure A of FIG. 11.

The swage-lock type battery A or the swage-lock type battery B was disposed in a chamber 130 of FIG. 13, and a water-filled container 131 was disposed next to the swage-lock type battery A or the swage-lock type battery B. The humidity of the chamber 130 was about 100% and the temperature thereof was controlled to be about 60° C.

In FIG. 13, only the swage-lock type battery A, which used the battery structure A including the composite membrane of Example 1, was illustrated for convenience in description.

Changes in resistance over time were measured for the swage-lock type lithium batteries A and B disposed in the chamber 130, in which moisture was provided.

Figure 14:
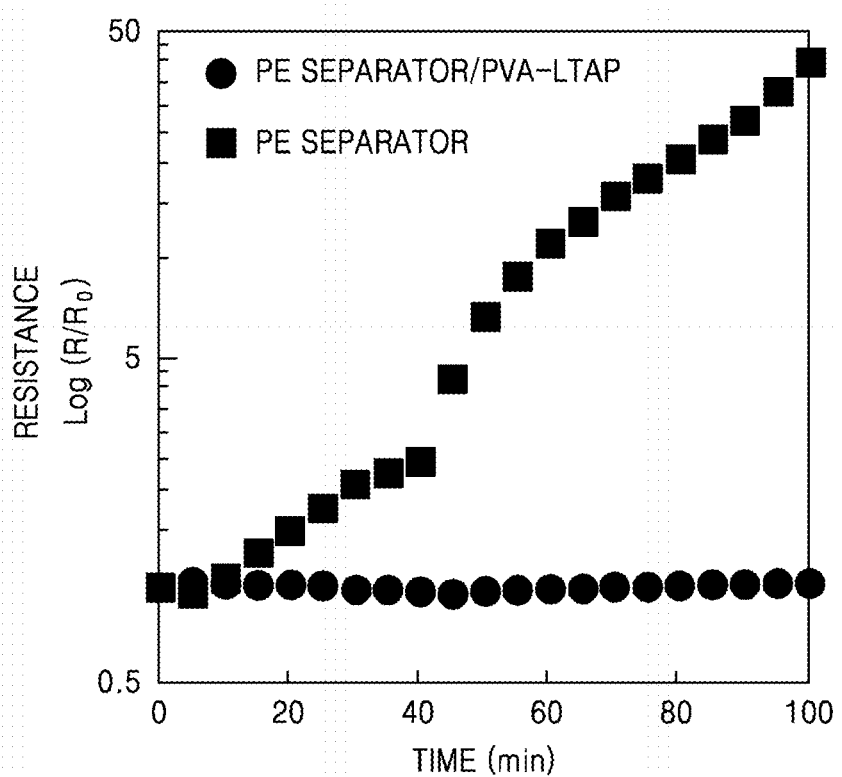
FIG. 14 is a graph of log resistance (resistance/initial resistance, $R/R_0$) versus time (minutes, min) illustrating changes in resistance characteristics of compression fitting-type (Swagelok®) test batteries A and B according to Evaluation Example 4 over time.

The results thereof are presented in FIG. 14, where R$_0$ and R respectively denote an initial resistance and a resistance measured over time. In FIG. 14, data denoted as "PE separator/PVA-LTAP" was for the swage-lock type lithium battery A and data denoted as "PE separator" was for the swage-lock type lithium battery B.

Referring to FIG. 14, with respect to the swage-lock type lithium battery A including the composite membrane of Example 1, since lithium metal was protected from moisture, high conductivity was continuously obtained while initial conductivity was maintained over time.

In contrast, with respect to the swage-lock type lithium battery B in which the composite membrane of Example 1 was not used, since lithium metal was not protected from moisture over time, it was observed that conductivity was significantly decreased.

Also, impedances of the swage-lock type lithium batteries A and B were measured. An impedance analyzer used was Material Mates 7260 by Material Mates. Furthermore, an operation temperature of the swage-lock type lithium batteries A and B was maintained at about 60° C. and the impedances were measured after about 5 minutes.

Figure 15:
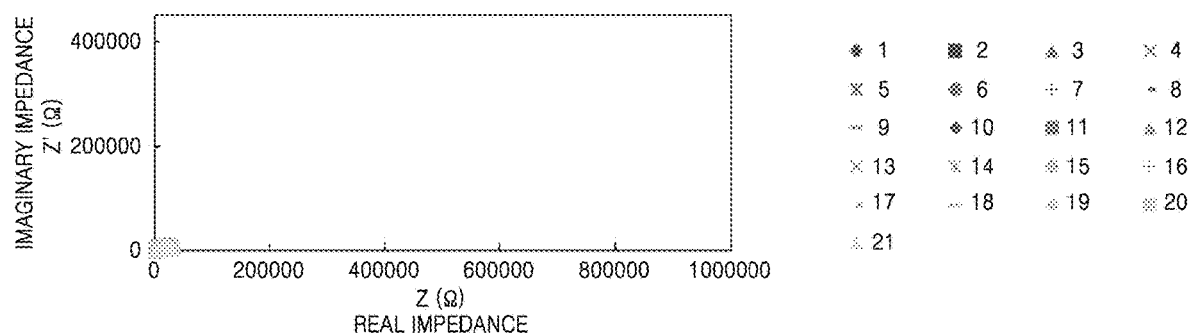
FIG. 15 is a graph of imaginary impedance (Z', ohms, $\Omega$) versus real impedance (Z, ohms, $\Omega$) which illustrates impedance characteristics of the compression fitting-type test battery A according to Evaluation Example 4.
Figure 16:
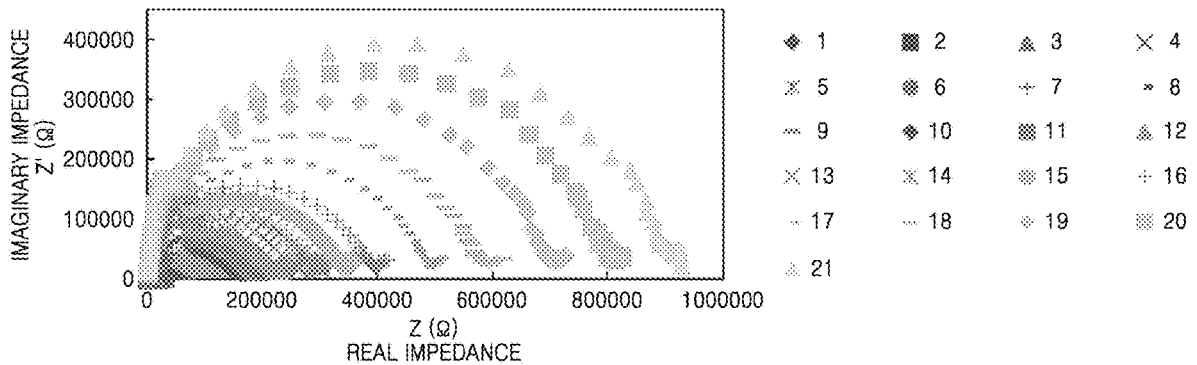
FIG. 16 is a graph of imaginary impedance (Z', ohms, $\Omega$) versus real impedance (Z, ohms, $\Omega$) which illustrates impedance characteristics of the compression fitting-type test battery B according to Evaluation Example 4.

With respect to the swage-lock type lithium batteries A and B, the results of impedance analyses according to storage time are respectively presented in FIGS. 15 and 16. In FIGS. 15 and 16, sizes of semicircles (diameters of the semicircles) were values of anode resistance ($R_a$).

As illustrated in FIG. 15, it may be understood that the impedance characteristics of the swage-lock type lithium battery A were significantly improved in comparison to the swage-lock type lithium battery B (see FIG. 16).

Evaluation Example 5: Charge and Discharge Characteristics and Cycle Characteristics of Lithium-Air Battery The lithium-air battery according to Preparation Example 5 was discharged in a constant current (CC) mode at a current density of about 0.12 milliamperes per square centimeter ($mA/cm^2$), and charged in the CC mode at a current density of about 0.12 $mA/cm^2$ and in a constant voltage (CV) mode at a voltage of about 4.0 V under oxygen pressure of about 1 atm in a chamber.

The battery exhibited a cathode discharge capacity of about 250 mAh/g per unit mass of carbon.

Figure 19:
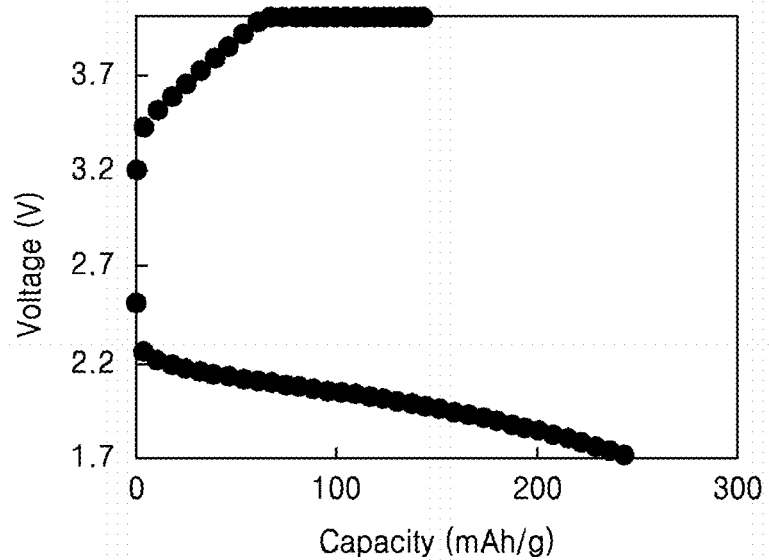
FIG. 19 is a graph of voltage (volts, V) versus capacity (milliampere-hours per gram, mAh/g) which illustrates changes in voltage of a lithium-air battery prepared according to Preparation Example 5 according to capacity.

After charge and discharge cycles were repeated, changes in voltage according to capacity were investigated, and the results thereof are presented in FIG. 19. Cycle characteristics are presented in FIG. 20.

Figure 20:
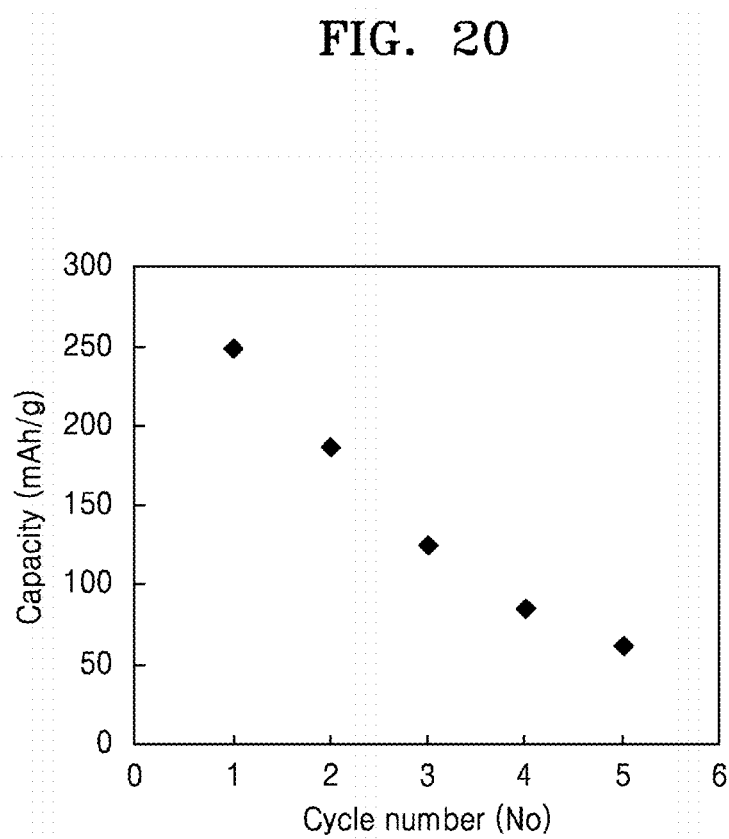
FIG. 20 is a graph of capacity (milliampere-hours per gram) versus cycle number which illustrates cycle characteristics of the lithium-air battery prepared according to Preparation Example 5.

Referring to FIGS. 19 and 20, it may be understood that the lithium-air battery of Preparation Example 5 had stable charge and discharge characteristics and cycle characteristics.

As described above, according to the one or more of the above embodiments, a composite membrane which is lightweight, can be formed as a thin film, and has excellent gas and moisture barrier properties, and improved ionic conductivity is provided. A lithium-air battery having improved cell performance may be prepared when the composite membrane is used.

While one or more embodiments have been described with reference to the figures, it will be understood by those of ordinary skill in the art that various changes in form and details may be made therein without departing from the spirit and scope of the present disclosure as defined by the following claims.

What is claimed is:

1. A composite membrane comprising:
   metal-ion conductive inorganic particles; and
   a polymer layer,
   wherein a metal-ion conductive inorganic particle of the metal-ion conductive inorganic particles penetrates the polymer layer,
   wherein the metal-ion conductive inorganic particle is a lithium-ion conductive inorganic particle,
   wherein a resistance of the composite membrane is in a range of about $1\times10^2$ ohms to about $9\times10^4$ ohms,
   wherein an average particle diameter of the metal-ion conductive inorganic particles is in a range of about 90 micrometers to about 300 micrometers, and
   wherein the metal-ion conductive inorganic particles comprise lithium titanium phosphate represented by $Li_xTi_y(PO_4)_3$ wherein $0<x<2$ and $0<y<3$, lithium aluminum titanium phosphate represented by $Li_xAl_yTi_z(PO_4)_3$ wherein $0<x<2$, $0<y<1$, $0<z<3$, a $Li_2O$—$Al_2O_3$—$SiO_2$—$P_2O_5$—$TiO_2$—$GeO_2$ ceramic, or a combination thereof.

2. The composite membrane of claim 1, wherein the metal-ion conductive inorganic particle is a single-body particle without a grain boundary therein.

3. The composite membrane of claim 1, wherein the metal-ion conductive inorganic particles comprise lithium aluminum titanium phosphate represented by $Li_xAl_yTi_z(PO_4)_3$ wherein $0<x<2$, $0<y<1$, a $Li_2O$—$Al_2O_3$—$SiO_2$—$P_2O_5$—$TiO_2$—$GeO_2$ ceramic, or a combination thereof.

4. The composite membrane of claim 1, wherein the metal-ion conductive inorganic particles comprise $Li_{1.4}Ti_{1.6}Al_{0.4}P_3O_{12}$ or a $Li_2O$—$Al_2O_3$—$SiO_2$—$P_2O_5$—$TiO_2$—$GeO_2$ ceramic.

5. The composite membrane of claim 1, wherein an average particle diameter of the metal-ion conductive inorganic particles is in a range of about 90 micrometers to about 200 micrometers.

6. The composite membrane of claim 1, wherein the polymer of the polymer layer has barrier properties effective to block a gas, moisture, or a combination thereof.

7. The composite membrane of claim 1, wherein the polymer comprises poly(2-vinyl pyridine), polytetrafluoroethylene, a tetrafluoroethylene-hexafluoropropylene copolymer, polychlorotrifluoroethylene, a perfluoroalkoxy copolymer, a fluorinated cyclic ether, polyethylene oxide diacrylate, polyethylene oxide dimethacrylate, polypropylene oxide diacrylate, polypropylene oxide dimethacrylate, polymethylene oxide diacrylate, polymethylene oxide dimethacrylate, polyalkyldiol diacrylate, polyalkyldiol dimethacrylate, polydivinylbenzene, polyether, polycarbonate, polyamide, polyester, polyvinyl chloride, polyimide, polycarboxylic acid, polysulfonic acid, polyvinyl alcohol, polysulfone, polystyrene, polyethylene, polypropylene, poly(p-phenylene), polyacetylene, poly(p-phenylene vinylene), polyaniline, polypyrrole, polythiophene, poly(2,5-ethylene vinylene), polyacene, poly(naphthalene-2,6-diyl), polyethylene oxide, polypropylene oxide, polyvinylidene fluoride, a copolymer of vinylidene fluoride and hexafluoropropylene, polyvinyl acetate, poly(vinyl butyral-co-vinyl alcohol-co-vinyl acetate), poly(methyl methacrylate-co-ethyl acrylate), polyacrylonitrile, polyvinyl chloride-co-vinyl acetate, poly(1-vinylpyrrolidone-co-vinyl acetate), polyvinylpyrrolidone, polyacrylate, polymethacrylate, polyurethane, polyvinyl ether, an acrylonitrile-butadiene rubber, a styrene-butadiene rubber, an acrylonitrile-butadiene-styrene rubber, a sulfonated styrene/ethylene-butylene triblock copolymer, a polymer obtained from one or more acrylate monomers selected from ethoxylated neopentyl glycol diacrylate, ethoxylated bisphenol A diacrylate, ethoxylated aliphatic urethane acrylate, ethoxylated alkylphenol acrylate, and alkyl acrylate, polyvinyl alcohol, polyimide, an epoxy resin, an acrylic resin, or a combination thereof.

8. The composite membrane of claim 1, wherein the polymer of the polymer layer comprises polyvinyl alcohol, polyacrylonitrile, polyimide, an epoxy resin, an acrylic resin, polyethylene, or combination thereof.

9. The composite membrane of claim 1, wherein an amount of the polymer of the polymer layer is in a range of about 50 parts by weight to about 80 parts by weight, based on 100 parts by weight of the composite membrane.

10. The composite membrane of claim 1, wherein an oxygen permeability of the composite membrane is in a range of about $5\times10^8$ $cm^3 \cdot cm/cm^2 \cdot s \cdot Pa$ to about $2\times10^{13}$ $cm^3 \cdot cm/cm^2 \cdot s \cdot Pa$.

11. The composite membrane of claim 1, wherein a thickness of the composite membrane is in a range of about 10 micrometers to about 200 micrometers.

12. The composite membrane of claim 1, wherein about 10 percent to about 90 percent of at least one surface of the composite membrane comprises the metal-ion conductive inorganic particles, and about 90 percent to about 10 percent of the at least one surface of the composite membrane comprises a polymer of the polymer layer.

13. The composite membrane of claim 1, further comprising a porous support on the polymer layer.

14. The composite membrane of claim 13, wherein the porous support comprises polyethylene, polypropylene, or a combination thereof.

15. The composite membrane of claim 1, wherein the composite membrane is an anode protective layer.

16. A secondary battery comprising the composite membrane of claim 1.

17. The secondary battery of claim 16, wherein the secondary battery is a lithium air secondary battery, a lithium ion secondary battery, or a lithium sulfur secondary battery.

18. The composite membrane of claim 1, wherein the metal-ion conductive inorganic particles comprise lithium aluminum titanium phosphate represented by $Li_xAl_yTi_z(PO_4)_3$ wherein $0<x<2$, $0<y<1$, $0<z<3$.

19. A composite membrane comprising:
metal-ion conductive inorganic particles; and
a polymer layer,
wherein a metal-ion conductive inorganic particle of the metal-ion conductive inorganic particles penetrates the polymer layer, and
wherein the metal-ion conductive inorganic particle is a lithium-ion conductive inorganic particle,
wherein an average particle diameter of the metal-ion conductive inorganic particles is in a range of about 90 micrometers to about 300 micrometers, and
wherein the metal-ion conductive inorganic particles comprise lithium titanium phosphate represented by $Li_xTi_y(PO_4)_3$ wherein $0<x<2$ and $0<y<3$, lithium aluminum titanium phosphate represented by $Li_xAl_yTi_z(PO_4)_3$ wherein $0<x<2$, $0<y<1$, and $0<z<3$, a $Li_2O$—$Al_2O_3$—$SiO_2$—$P_2O_5$—$TiO_2$—$GeO_2$ ceramic, or a combination thereof.

20. A composite membrane comprising:
metal-ion conductive inorganic particles; and
a polymer layer,
wherein a metal-ion conductive inorganic particle of the metal-ion conductive inorganic particles penetrates the polymer layer,
wherein the metal-ion conductive inorganic particle is a lithium-ion conductive inorganic particle,
wherein an average particle diameter of the metal-ion conductive inorganic particles is in a range of about 90 micrometers to about 300 micrometers,
wherein an amount of the polymer of the polymer layer is in a range of about 55 parts by weight to about 80 parts by weight, based on 100 parts by weight of the composite membrane, and
wherein the metal-ion conductive inorganic particles comprise lithium titanium phosphate represented by $Li_xTi_y(PO_4)_3$ wherein $0<x<2$ and $0<y<3$, lithium aluminum titanium phosphate represented by $Li_xAl_yTi_z(PO_4)_3$ wherein $0<x<2$, $0<y<1$, $0<z<3$, a $Li_2O$—$Al_2O_3$—$SiO_2$—$P_2O_5$—$TiO_2$—$GeO_2$ ceramic, or a combination thereof.

* * * * *